(12) United States Patent
Fujita et al.

(10) Patent No.: US 12,261,313 B2
(45) Date of Patent: Mar. 25, 2025

(54) BUFFER MEMBER AND POWER STORAGE MODULE

(71) Applicant: Panasonic Intellectual Property Management Co., Ltd., Osaka (JP)

(72) Inventors: Goro Fujita, Osaka (JP); Shota Norimine, Osaka (JP); Tetsuji Omura, Hyogo (JP); Mitsutoshi Tajima, Hyogo (JP); Shingo Kume, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 698 days.

(21) Appl. No.: 17/597,697

(22) PCT Filed: Jul. 27, 2020

(86) PCT No.: PCT/JP2020/028643
§ 371 (c)(1),
(2) Date: Jan. 19, 2022

(87) PCT Pub. No.: WO2021/020326
PCT Pub. Date: Feb. 4, 2021

(65) Prior Publication Data
US 2022/0285773 A1 Sep. 8, 2022

(30) Foreign Application Priority Data
Jul. 31, 2019 (JP) .................... 2019-140642

(51) Int. Cl.
*H01M 50/242* (2021.01)
*H01M 50/209* (2021.01)
*H01M 50/489* (2021.01)

(52) U.S. Cl.
CPC ....... *H01M 50/242* (2021.01); *H01M 50/209* (2021.01); *H01M 50/489* (2021.01)

(58) Field of Classification Search
CPC ............ H01M 50/242; H01M 50/209; H01M 50/489; H01M 50/293; H01M 50/249; H01M 50/258; Y02E 60/10; H01G 11/12
See application file for complete search history.

(56) References Cited

U.S. PATENT DOCUMENTS

| 2013/0252063 A1 | 9/2013 | Park |
| 2018/0145295 A1 | 5/2018 | Sohn et al. |

FOREIGN PATENT DOCUMENTS

| CN | 103325977 A | 9/2013 |
| CN | 108075071 A | 5/2018 |
| JP | 2009-081056 | 4/2009 |

OTHER PUBLICATIONS

English Translation of Chinese Office Action dated Feb. 9, 2023 for the related Chinese Patent Application No. 202080038722.X.
(Continued)

*Primary Examiner* — Helen Oi K Conley
(74) *Attorney, Agent, or Firm* — Rimon P.C.

(57) ABSTRACT

A power storage module includes at least one power storage device, and a buffer member arranged with the power storage device in a first direction X. The buffer member includes a hard part having a predetermined hardness and a soft part softer than the hard part, the hard part and the soft part receiving a load in first direction X from the power storage device. The hard part changes its shape by receiving a load of a predetermined magnitude or more. The buffer member changes its state, by the hard part changing its shape, from a first state in which the load is received by the hard part to a second state in which the load is received by the soft part.

13 Claims, 16 Drawing Sheets

(56) References Cited

OTHER PUBLICATIONS

International Search Report of PCT application No. PCT/JP2020/028643 dated Oct. 6, 2020.

FIG. 4
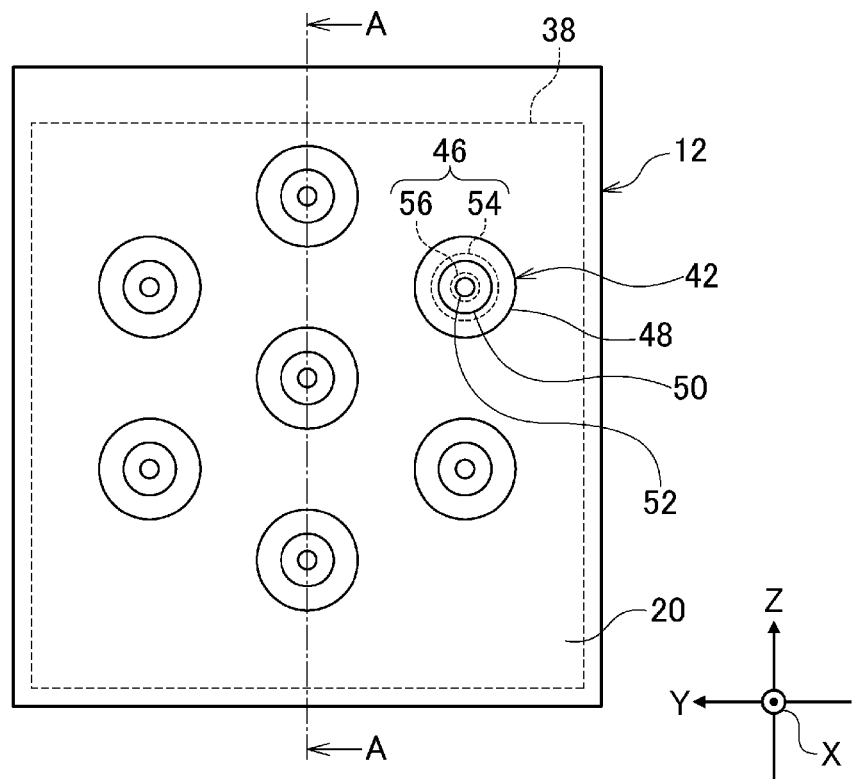
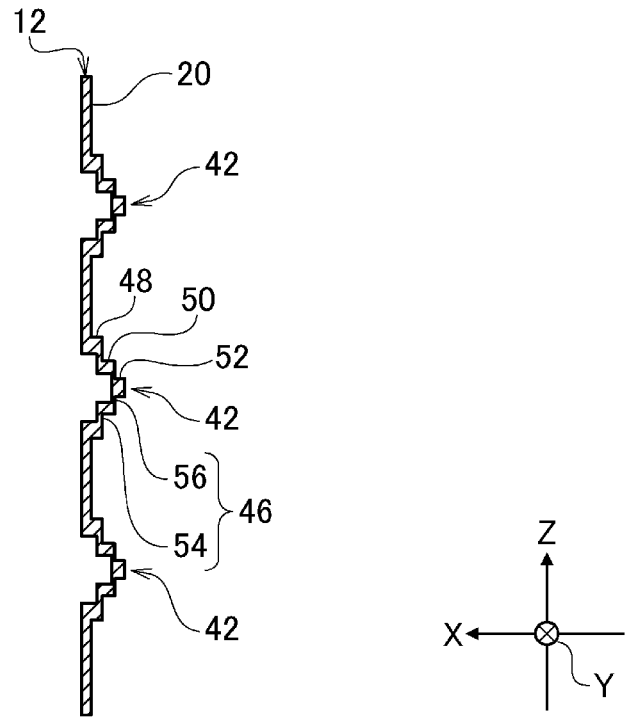

FIG. 5
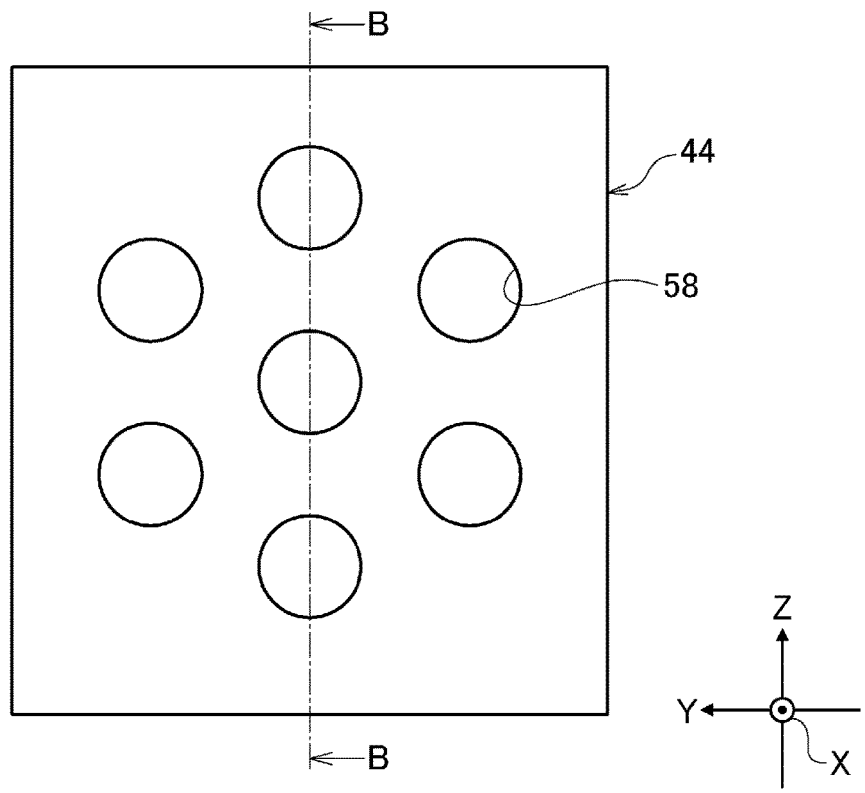
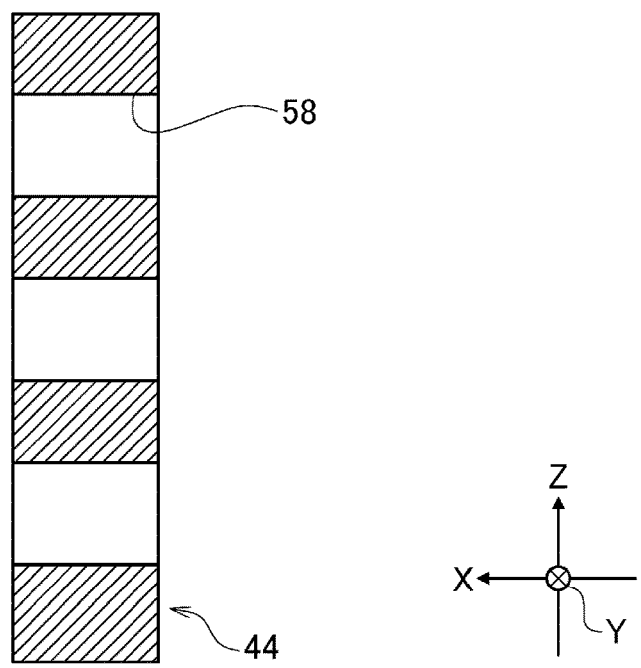

FIG. 8
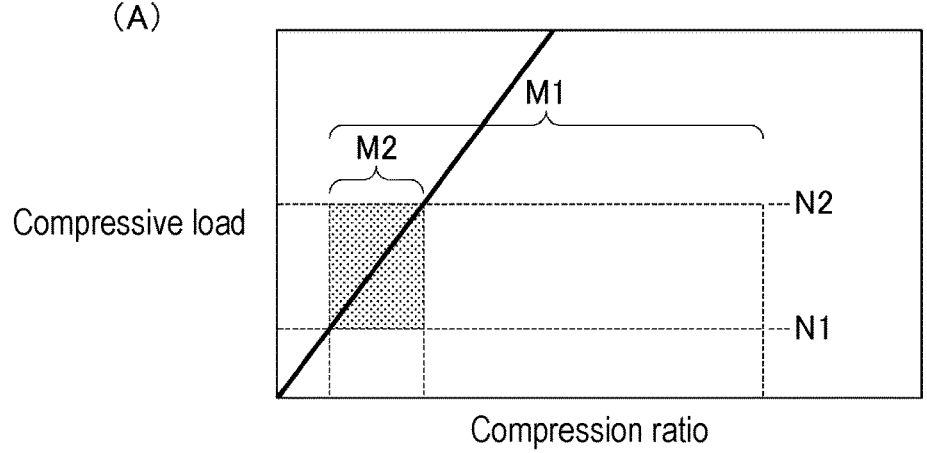
(A)
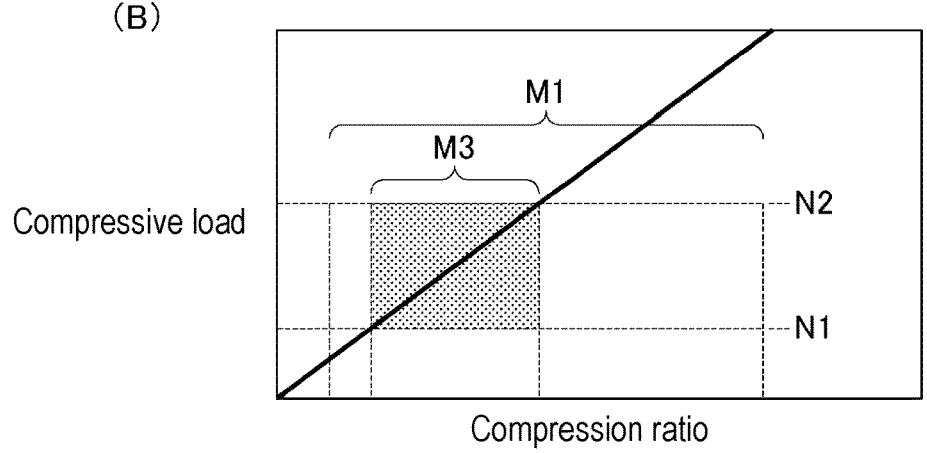
(B)
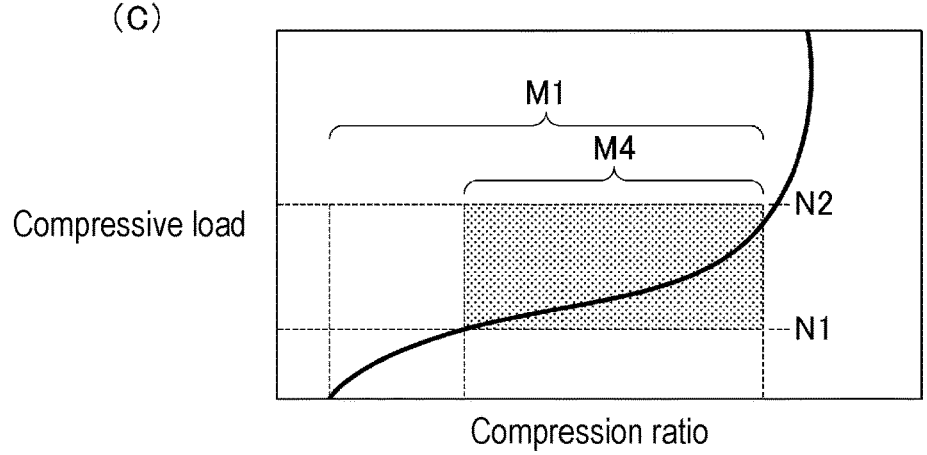
(C)

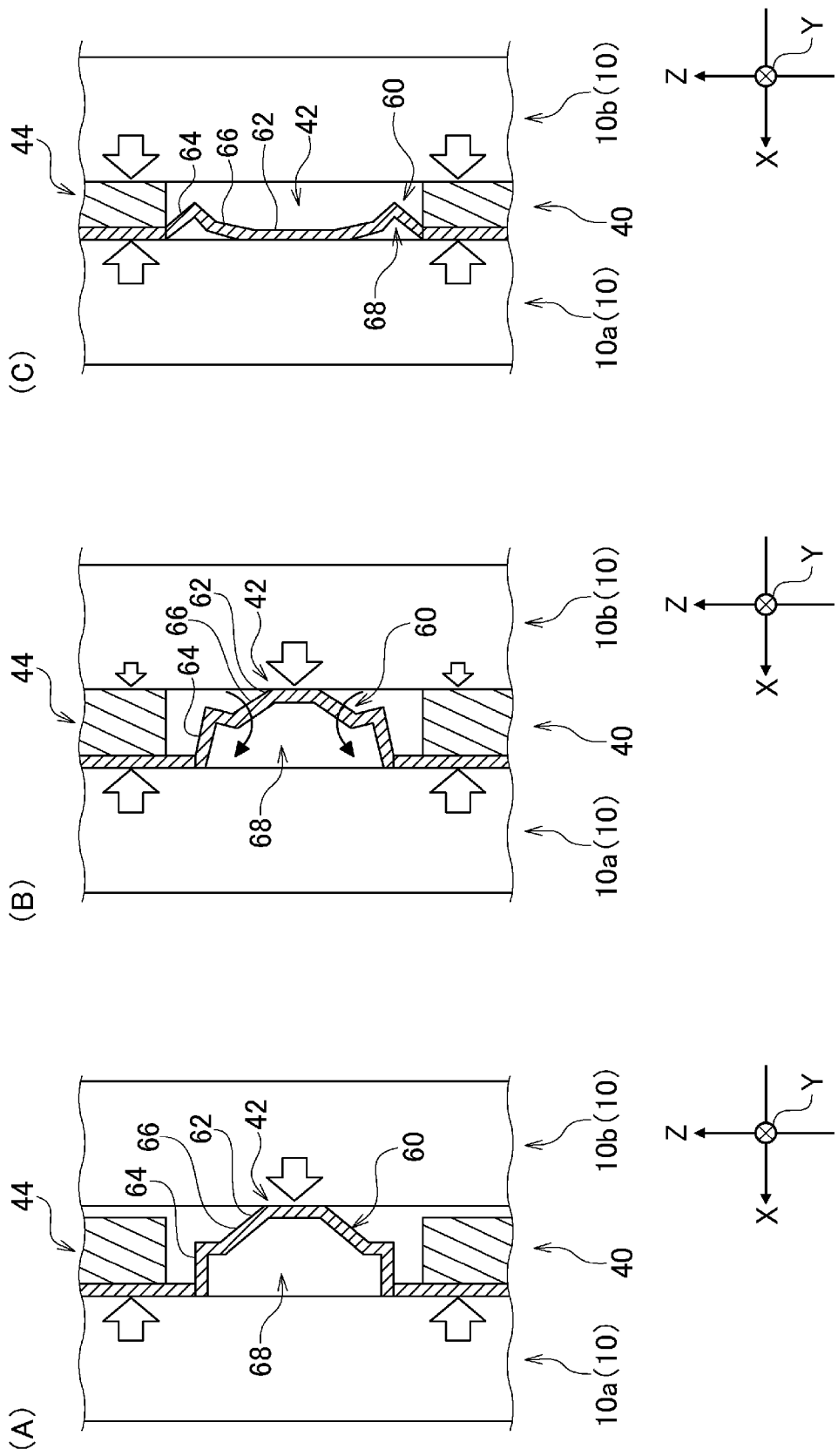

BUFFER MEMBER AND POWER STORAGE MODULE

CROSS-REFERENCE TO RELATED APPLICATIONS

This application is a U.S. national stage application of the PCT International Application No. PCT/JP2020/028643 filed on Jul. 27, 2020, which claims the benefit of foreign priority of Japanese patent application No. 2019-140642 filed on Jul. 31, 2019, the contents all of which are incorporated herein by reference.

TECHNICAL FIELD

The present disclosure relates to a buffer member and a power storage module.

BACKGROUND ART

As a power source required of a high output voltage to be used for a vehicle, for example, a power storage module in which a plurality of power storage devices (for example, batteries) is connected in series is known. A power storage module typically includes a plurality of power storage devices, a plurality of separators each disposed between adjacent power storage devices, a pair of end plates disposed at both ends in an arrangement direction of the power storage devices, and a bind bar extending across the pair of end plates to bind the plurality of power storage devices in the arrangement direction.

A power storage device typically repeats expansion and contraction along with charging and discharging. A conventional power storage module suppresses expansion by end plates and a bind bar. In such a structure, a load to the bind bar by a large expansion of the power storage device might cause damage. In this regard, PTL 1 discloses a power storage module provided with an elastic member (buffer member) between a battery holder and an end plate so as to sandwich a battery. In this power storage module, when the battery expands, the elastic member elastically deforms, whereby the load caused by the expansion of the battery is absorbed by the elastic member.

CITATION LIST

Patent Literature

PTL 1: Unexamined Japanese Patent Publication No. 2009-81056

SUMMARY OF THE INVENTION

In recent years, there has been a demand for power storage modules to have further higher capacity. To meet this demand, the capacity of power storage devices has been in increase. As the capacity of power storage devices increases, the amount of expansion of power storage devices may increase. Thus, the absorbing amount of expansion required of the buffer member also increases. Meanwhile, to maintain electrical connection between power storage devices and prevent a power storage device from jumping out due to an external impact or the like, a buffer member needs to fix the power storage device at its position while absorbing the expansion of the power storage device.

In addition, the amount of expansion of a power storage device typically increases with time during a use period. That is, the amount of expansion of the power storage device differs between the initial stage of life and the end stage of life. Thus, a buffer member used in a power storage module is required to be able to absorb a large expansion of a power storage device in the end stage of life, and to be able to position the power storage device with high accuracy in the initial stage off life in which the amount of expansion of the power storage device is small.

In a conventional power storage module in which the expansion of a power storage device is absorbed by an elastic member, a single material is used for the elastic member, so that it is difficult to achieve both absorbing of expansion and positioning of the power storage device. Achieving both absorbing of expansion and positioning of the power storage device leads to improvement of reliability of the power storage module, and is thus desired.

The present disclosure is made in view of these issues. An object of the present disclosure is to provide a technique for enhancing reliability of a power storage module.

An aspect of the present disclosure is a power storage module. The power storage module includes at least one power storage device, and a buffer member arranged with the power storage device in a first direction. The buffer member includes a hard part having a predetermined hardness and a soft part softer than the hard part, the hard part and the soft part being configured to receive a load in the first direction from the power storage device. The hard part changes its shape by receiving a load of a predetermined magnitude or more, and the buffer member changes its state, by the hard part changing its shape, from a first state in which the hard part receives the load to a second state in which the soft part receives the load.

Another aspect of the present disclosure is a buffer member arranged with at least one power storage device in the first direction. The buffer member includes a hard part having a predetermined hardness and a soft part softer than the hard part, the hard part and the soft part being configured to receive a load in the first direction from the power storage device. The hard part changes its shape by receiving a load of a predetermined load or more, and the buffer member changes its state, by the hard part changing its shape, from a first state in which the hard part receives the load to a second state in which the soft part receives the load.

Any combination of the above configuration elements and any conversion of an expression in the present disclosure among methods, devices, systems, and the like are also effective as an aspect of the present disclosure.

According to the present disclosure, the reliability of a power storage module can be enhanced.

BRIEF DESCRIPTION OF DRAWINGS

FIG. 4(A) is a front view of a hard part included in a buffer member according to a first exemplary embodiment. FIG. 4(B) is a cross-sectional view taken along line A-A in FIG. 4(A).

FIG. 5(A) is a front view of a soft part included in the buffer member. FIG. 5(B) is a cross-sectional view taken along line B-B in FIG. 5(A).

FIG. 8(A) is a view illustrating the relationship between the compressive load and the compression ratio of the buffer member when the hard part is in the state illustrated in FIG. 7(A). FIG. 8(B) is a view illustrating the relationship between the compressive load and the compression ratio of the buffer member when the hard part is in the state illustrated in FIG. 7(B). FIG. 8(C) is a view illustrating the relationship between the compressive load and the compression ratio of the buffer member when the hard part is in the state illustrated in FIG. 7(C).

FIG. 16(A) to FIG. 16(C) are cross-sectional views schematically illustrating the buffer member changing its shape by receiving loads from the power storage devices.

DESCRIPTION OF EMBODIMENTS

Figure 1:
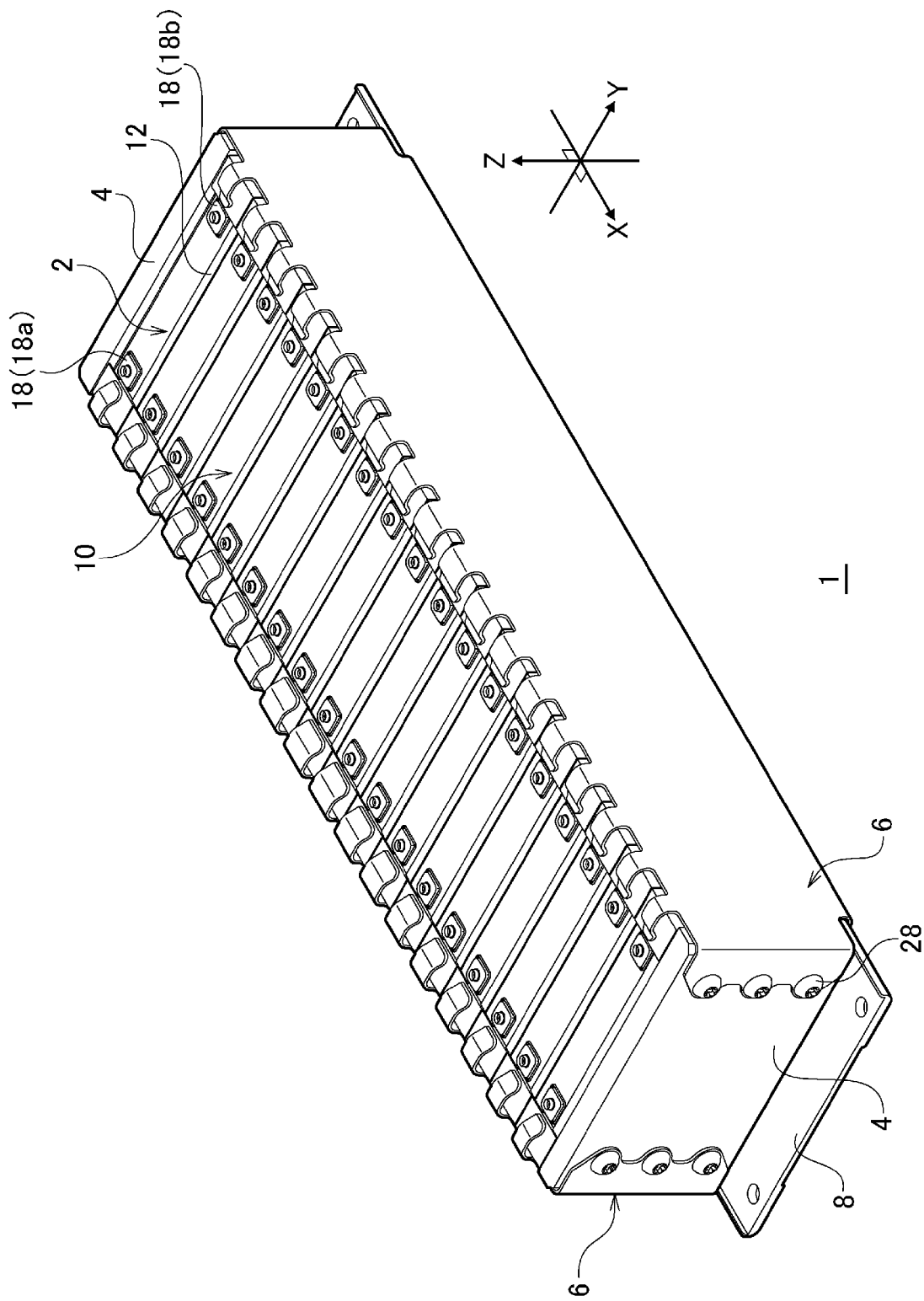
FIG. 1 is a perspective view of a power storage module according to an exemplary embodiment.

Hereinafter, the present disclosure will be described on the basis of preferred exemplary embodiments with reference to the drawings. The exemplary embodiments are examples not intended to limit the present disclosure, and all features described in the exemplary embodiments and combinations thereof are not always essential to the present disclosure. The same or equivalent configuration elements, members, or processes illustrated in the drawings are denoted by the same reference marks, and a redundant description will be omitted as appropriate. The scale and shape of each part illustrated in the drawings are set for convenience in order to facilitate the description and are not limitedly interpreted unless otherwise specified. When terms such as "first" and "second" are used in the specification or claims, unless otherwise specified, these terms do not represent any order or importance but are intended to distinguish one configuration from another configuration. Furthermore, a part of a member that is not important to describe the exemplary embodiments is not illustrated in the drawings.

First Exemplary Embodiment

Figure 2:
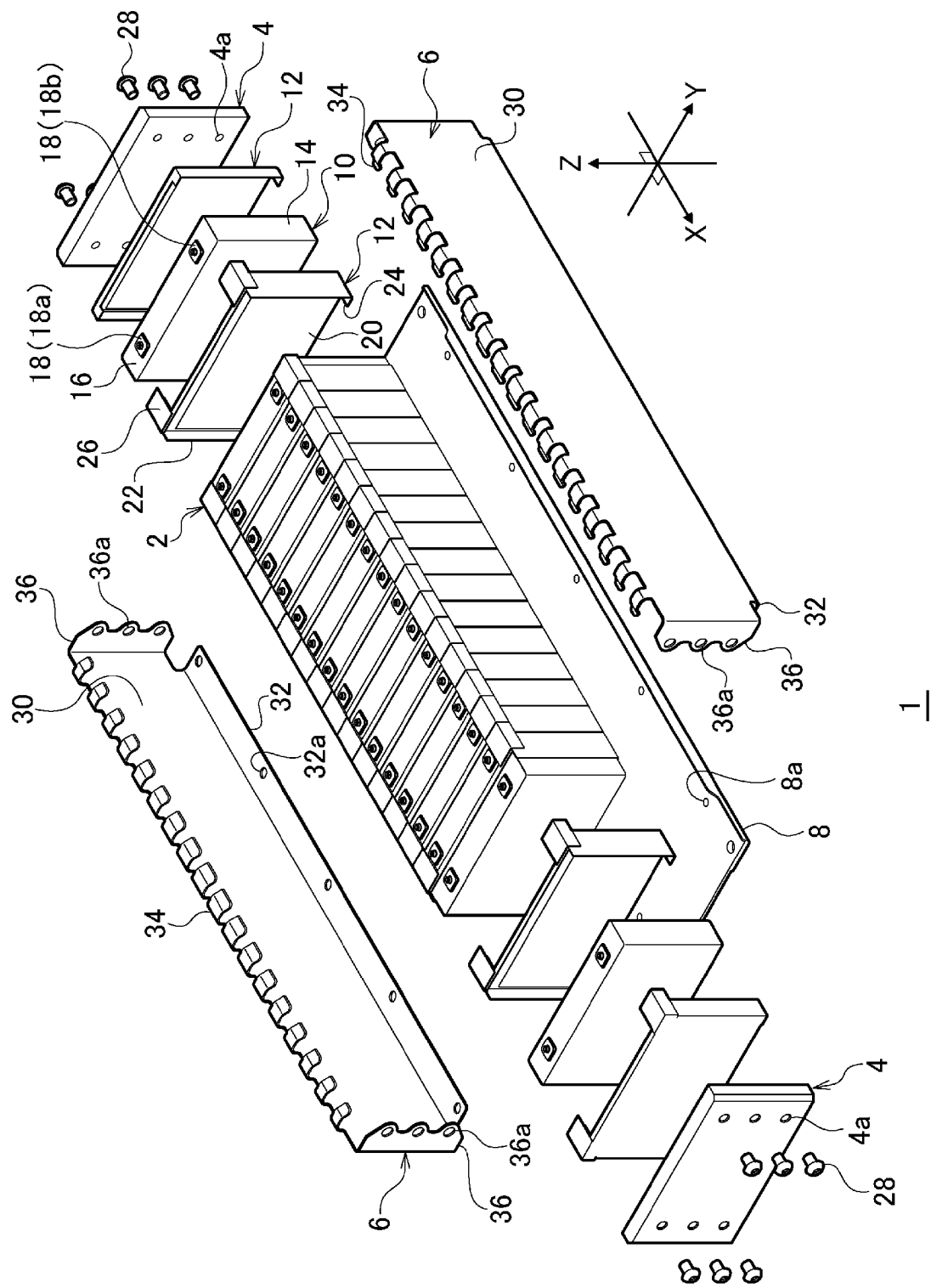
FIG. 2 is an exploded perspective view of the power storage module.

FIG. 1 is a perspective view of a power storage module according to an exemplary embodiment. FIG. 2 is an exploded perspective view of the power storage module. In FIG. 2, illustration of buffer member 40 (see FIG. 6) is omitted. As an example, power storage module 1 includes battery stack 2, a pair of binding members 6, and cooling plate 8. Battery stack 2 includes a plurality of power storage devices 10, a plurality of separators 12, and a pair of end plates 4.

Each power storage device 10 is, for example, a rechargeable secondary battery such as a lithium ion battery, a nickel-hydrogen battery, and a nickel-cadmium battery, or a capacitor such as an electric double layer capacitor. Power storage device 10 is a so-called prismatic battery and includes exterior can 14 having a flat rectangular-parallelepiped shape. Exterior can 14 has an opening having a substantially rectangular shape on one face. Electrode body 38 (see FIG. 3) including a positive electrode, a negative electrode, and a porous separator, an electrolytic solution, and the like are inserted through the opening to be accommodated in exterior can 14. Exterior can 14 is covered with an insulating film such as a shrink tube which is not illustrated. Covering the faces of exterior can 14 with the insulating film can suppress happening of a short circuit between neighboring power storage devices 10, a short circuit between power storage device 10 and end plate 4, and a short circuit between binding member 6 and cooling plate 8. The opening of exterior can 14 is provided with sealing plate 16 to cover the opening and seal up exterior can 14.

Sealing plate 16 is provided with output terminal 18 near one end in the longitudinal direction to be electrically connected to the positive electrode of electrode body 38, and output terminal 18 near the other end in the longitudinal direction to be electrically connected to the negative electrode of electrode body 38. Hereinafter, as necessary, output terminal 18 connected to the positive electrode is referred to as positive-electrode terminal 18a, and output terminal 18 connected to the negative electrode is referred to as negative-electrode terminal 18b. When it is not necessary to distinguish the polarity of output terminal 18, positive-electrode terminal 18a and negative-electrode terminal 18b are collectively referred to as output terminal 18. Exterior can 14 and sealing plate 16 are each a conductive body, and are made of metal, for example, aluminum, iron, or stainless steel. Sealing plate 16 and exterior can 14 are joined to each other by, for example, laser, friction stir bonding, or brazing.

Exterior can 14 has a bottom face that opposes sealing plate 16. Exterior can 14 has four side faces connecting together the opening and the bottom face. Two of the four side faces are a pair of long side faces connected to two opposing long sides of the opening. Each of the long side faces is a face having the largest area among the faces of exterior can 14, that is, a main surface. The two side faces other than the two long side faces are a pair of short side faces connected to the opening of exterior can 14 and short sides of the bottom face.

For convenience of describing the present exemplary embodiment, a face where sealing plate 16 is provided is defined as an upper face of power storage device 10. The bottom face of exterior can 14 is defined as the bottom face of power storage device 10, the long side face of exterior can 14 is defined as the long side face of power storage device 10, and the short side face of exterior can 14 is defined as the short side face of power storage device 10. In power storage module 1, an upper face side of power storage device 10 is defined as the upper face of power storage module 1, a bottom face side of power storage device 10 is defined as the bottom face of power storage module 1, and a short side face of power storage device 10 is defined as the side face of power storage module 1. The upper face side of power storage module 1 is defined as the upper side in the vertical direction, and the bottom face side of power storage module 1 is defined as the lower side in the vertical direction. These directions and positions are defined for convenience. Thus, for example, a part defined as an upper face in the present disclosure does not mean that it is always located above a part defined as a bottom face. Thus, sealing plate 16 is not necessarily located above bottom face of exterior can 14.

Sealing plate 16 is provided with a safety valve (not shown) between the pair of output terminals 18. The safety valve is configured to open to release the gas in exterior can 14 when the internal pressure of exterior can 14 has risen to a predetermined value or more. Safety valve includes, for example, a thin part provided at a part of sealing plate 16 to have a thickness smaller than the thickness of other parts, and a linear groove formed on a surface of the thin part. In this configuration, when the internal pressure of exterior can 6 rises, the thin part tears from the groove, and thereby safety valve 14 opens.

The plurality of power storage devices 10 is arranged side by side at predetermined intervals such that the long side faces of adjacent power storage devices 10 face each other. In the present exemplary embodiment, a direction in which the plurality of power storage devices 10 is arranged is defined as first direction X. Output terminals 18 of each power storage device 10 are disposed so as to point the same direction. In the present exemplary embodiment, output terminals 18 of power storage devices 10 are disposed to point upward in the vertical direction for convenience. Alternatively, output terminals 18 of power storage devices 10 may be disposed to point different directions.

Two adjacent power storage devices 10 are arranged (stacked) so as positive-electrode terminal 18a of one power storage device 10 to be adjacent to negative-electrode terminal 18b of another power storage device 10. Positive-electrode terminal 18a and negative-electrode terminal 18b are connected in series via a bus bar (not shown). Alternatively, output terminals 18 of the same polarity of the plurality of power storage devices 10 adjacent to each other may be connected in parallel by a bus bar to form a power storage device block, and the power storage device blocks may be connected in series.

Separator 12 is also referred to as insulating spacer, is disposed between adjacent two power storage devices 10 to provide electrical insulation between adjacent two power storage devices 10. Separator 12 is made of a resin having an insulating property, for example. Examples of the resin of which separator 12 is made include thermoplastic resins such as polypropylene (PP), polybutylene terephthalate (PBT), polycarbonate (PC), and Noryl (registered trademark) resin (modified PPE). The plurality of power storage devices 10 and the plurality of separators 12 are alternately stacked. Separator 12 is also disposed between power storage device 10 and end plate 4.

Separator 12 has flat surface part 20 and wall part 22. Flat surface part 20 is disposed between opposing long side faces of two adjacent power storage devices 10. This further reliably insulates exterior cans 14 of adjacent power storage devices 10 from each other.

Wall part 22 extends from a peripheral rim of flat surface part 20 in first direction X in which power storage devices 10 are arranged, and covers a part of the upper face, the side face, and a part of the bottom face of power storage device 10. With this configuration, the creepage distance between adjacent power storage devices 10 or between power storage device 10 and end plate 4 can be secured. In addition, insulation between exterior can 14 of power storage device 10 and binding member 6 can further reliably provided. Furthermore, the position of power storage device 10 in second direction Y in which output terminals 18 are arranged and in third direction Z in which the upper face and the bottom face of power storage device 10 are arranged can be restricted or fixed. First direction X, second direction Y, and third direction Z are directions orthogonal to each other.

Wall part 22 includes cutout 24 through which the bottom face of power storage device 10 is exposed. With cutout 24 provided, hindering of thermal connection between power storage device 10 and cooling plate 8 by separator 12 can be avoided. Separator 12 has urge receiving parts 26 facing upward at both ends in second direction Y.

The plurality of power storage devices 10 and the plurality of separators 12 arranged side by side are sandwiched in first direction X by the pair of end plates 4. Separator 12 is disposed between each of the pair of end plates 4 and corresponding power storage device 10 among power storage devices 10 disposed at both ends in first direction X. This further reliably provide insulation between exterior can 14 of power storage device 10 and end plate 4. End plate 4 is formed of, for example, a metal sheet. End plate 4 is provided with screw hole 4a that penetrates end plate 4 in first direction X and in which fastening screw 28 is screwed.

The pair of binding members 6 is also referred to as bind bars, and are elongated members of which longitudinal direction is first direction X. The pair of binding members 6 is disposed so as to face each other in second direction Y. Battery stack 2 is disposed between the pair of binding members 6. Each binding member 6 includes body part 30, supporting part 32, a plurality of urging parts 34, and a pair of fixing parts 36.

Body part 30 is a rectangular part extending in first direction X. Body part 30 extends in parallel to the side faces of power storage devices 10. Supporting part 32 extends in first direction X and protrudes in second direction Y from the lower end of body part 30. Supporting part 32 is a plate-shaped body continuous in first direction X, and supports battery stack 2.

The plurality of urging parts 34 is connected to the upper end of body part 30 and protrudes in second direction Y. Supporting part 32 and urging parts 34 face each other in third direction Z. The plurality of urging parts 34 is arranged at predetermined intervals in first direction X. Urging parts 34 are each disposed corresponding to respective power storage device 10. Each of urging parts 34 has a leaf spring shape and urges power storage device 10 toward supporting part 32.

The pair of fixing parts 36 is plate-shaped bodies projecting in second direction Y from both ends, in first direction X, of body part 30. The pair of fixing parts 36 opposes each other in first direction X. Each fixing part 36 is provided with through-holes 36a through which fastening screws 28 are inserted. The pair of fixing parts 36 fixes binding member 6 to battery stack 2.

Cooling plate 8 is a mechanism for cooling the plurality of power storage devices 10. Cooling plate 8 is formed of a material having a heat transfer property such as metal. Battery stack 2 bound by the pair of binding members 6 is placed on a main surface of cooling plate 8, and fixed to cooling plate 8 by fastening members (not shown) such as screws inserted through through-holes 32a of supporting parts 32 and through-holes 8a of cooling plate 8. Power storage devices 10 are cooled by heat exchange between power storage device 10 and cooling plate 8. Cooling plate 8 may be provided with a refrigerant pipe (not shown) in which refrigerant flows.

Power storage module 1 is assembled, for example, as follows. The plurality of power storage devices 10 and the plurality of separators 12 are alternately arranged and sandwiched between the pair of end plates 4 in first direction X, and thereby battery stack 2 is formed. Battery stack 2 is sandwiched between the pair of binding members 6 in second direction Y. Each binding member 6 is positioned such that through-holes 36a overlap with screw holes 4a of end plates 4. In this state, fastening screws 28 are inserted through through-holes 36a and screwed into screw holes 4a. The pair of binding members 6 engages with the pair of end plates 4 in this manner, thereby binding the plurality of power storage devices 10. Battery stack 2 is fastened by binding members 6 with a predetermined pressure applied in first direction X.

Power storage devices 10 are positioned in first direction X by binding members 6 fastening power storage devices 10 in first direction X. Bottom faces of power storage devices 10 are supported by supporting parts 32. Wall part 22 of separator 12 is disposed between the bottom face of power storage device 10 and supporting part 32. Urging part 34 abuts on urge receiving part 26 of corresponding power storage device 10. Each urging part 34 urges power storage device 10 toward supporting part 32 via urge receiving part 26. That is, power storage devices 10 are sandwiched in third direction Z by supporting parts 32 and the plurality of urging parts 34. As a result, power storage devices 10 are positioned in third direction Z.

Exemplarily, after the positioning is completed, bus bars are attached to output terminals 18 of power storage devices 10, and output terminals 18 of the plurality of power storage devices 10 are electrically connected to each other. For example, bus bars are fixed to output terminals 18 by welding. Then, the upper face of battery stack 2 is covered with a cover member (not shown). The cover member prevents dew condensation water, dust, and the like from making contact with output terminal 18 of power storage device 10, the bus bar, the safety valve, and the like. The cover member is formed of a resin having, for example, an insulating property, and can be fixed to the upper face of battery stack 2 by a known fixing structure (not shown) including screws and known engaging mechanisms.

Battery stack 2 to which binding members 6 and the cover member are attached is placed on cooling plate 8, and fixed to cooling plate 8 by fastening members inserted through through-holes 8a and through-holes 32a. Power storage module 1 is obtained by the steps described above. Note that, power storage module 1 may be manufactured by setting battery stack 2 on cooling plate 8 and then fixing together battery stack 2 and cooling plate 8 by binding members 6. In this case, cooling plate 8 is disposed in the inner side of the pair of binding members 6.

Figure 3:
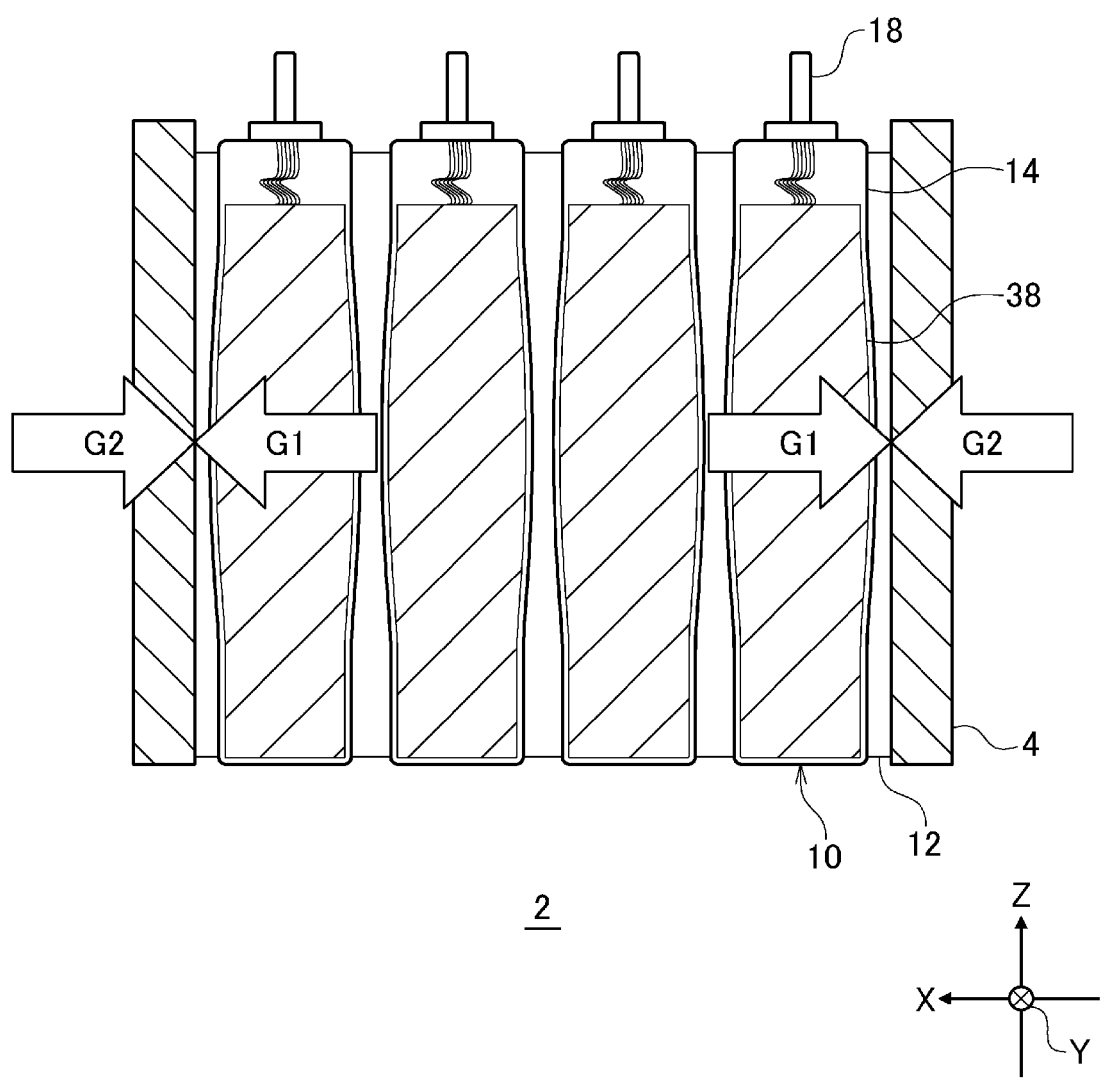
FIG. 3 is a cross-sectional view schematically illustrating expanding power storage devices.

FIG. 3 is a cross-sectional view schematically illustrating expanding power storage devices 10. Power storage devices 10 are illustrated in FIG. 3 by a reduced number. The internal structure of power storage devices 10 and separators 12 are illustrated in a simplified manner. As illustrated in FIG. 3, electrode body 38 is housed inside each power storage device 10. In power storage device 10, exterior can 14 repeatedly expands and contracts with charging and discharging. Exterior can 14 expands mainly by expansion of electrode body 38. When exterior cans 14 of power storage devices 10 expand, load G1 directed outward in first direction X is produced in battery stack 2. Meanwhile, load G2 corresponding to load G1 is applied to battery stack 2 by binding member 6. This suppresses the expansion of power storage devices 10.

In this structure, when power storage devices 10 expand, loads are applied to binding members 6. In recent years, the amount of expansion of power storage device 10 has been in increase with an increase in capacity of power storage device 10, and therefore the load applied to binding member 6 has also been in increase. An excess load applied to binding member 6 might damage binding member 6. Raising the strength of binding member 6 to prevent damage may lead to an increase in size and cost of binding member 6 as well as power storage module 1. Furthermore, suppressing the expansion of power storage devices 10 by binding members 6 may excessively press electrode bodies 38 (in particular, porous separators) and may deteriorate the performance of power storage devices 10 or shorten the life of power storage devices 10.

Loosening the binding of power storage devices 10 by binding members 6 can reduce the load applied to binding members 6. However, a certain level of load needs to be applied to power storage devices 10 to position power storage devices 10 in power storage module 1. Thus, the binding of power storage devices 10 cannot be simply loosened. Typically, the amount of expansion of power storage device 10 gradually increases from the initial stage of life to the end stage of life. Thus, the magnitude of the load to be applied to power storage device 10 differs between the initial stage of life and the end stage of life of power storage device 10.

Figure 6:
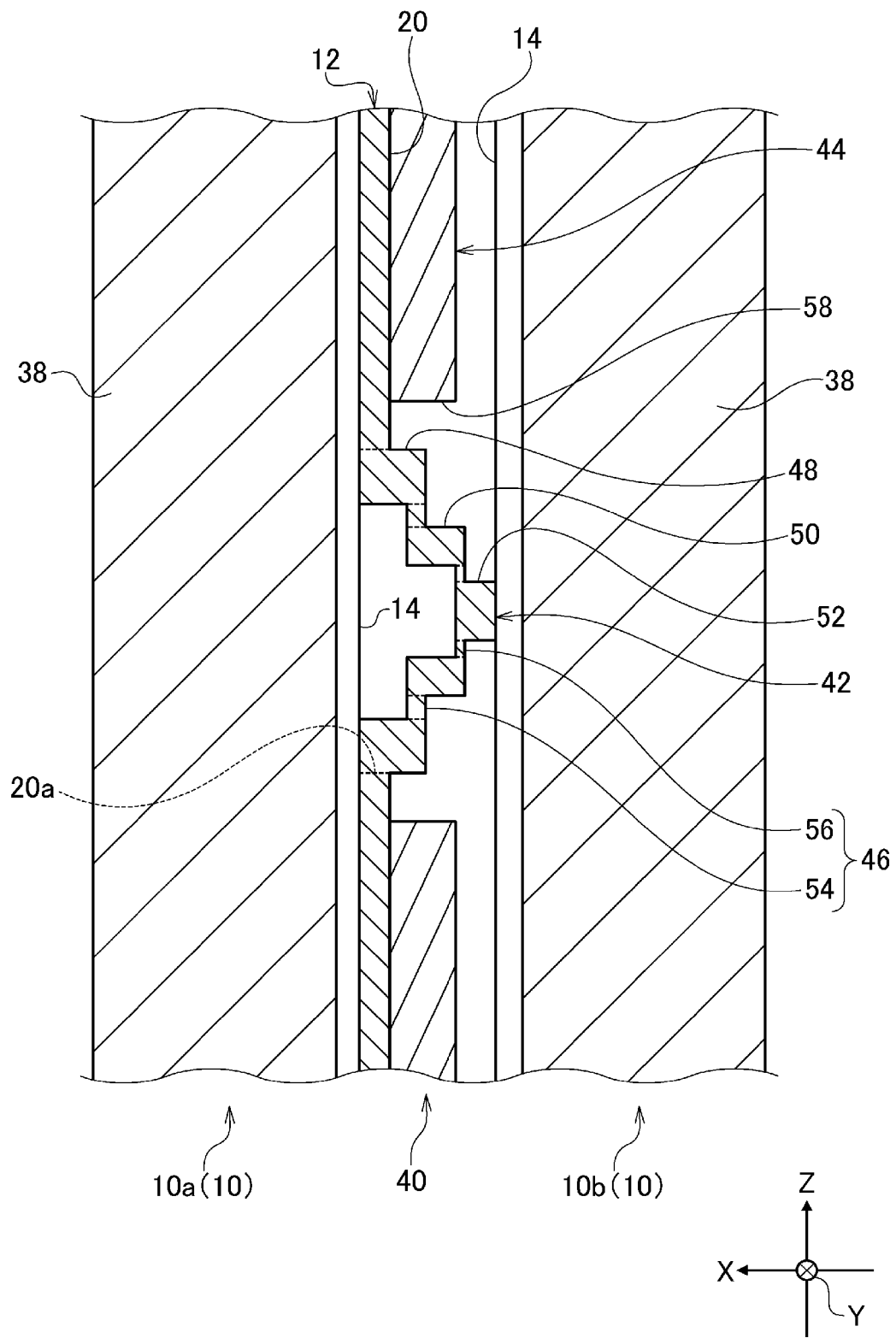
FIG. 6 is a cross-sectional view of the buffer member sandwiched between two adjacent power storage devices.

In contrast, power storage module 1 according to the present exemplary embodiment includes buffer members 40 arranged with the plurality of power storage devices 10 in first direction X. FIG. 4(A) is a front view of a hard part included in buffer member 40 according to the first exemplary embodiment. FIG. 4(B) is a cross-sectional view taken along line A-A in FIG. 4(A). FIG. 5(A) is a front view of a soft part included in buffer member 40. FIG. 5(B) is a cross-sectional view taken along line B-B in FIG. 5(A). FIG. 6 is a cross-sectional view of buffer member 40 sandwiched between two adjacent power storage devices 10. Illustration of wall part 22 is omitted in FIG. 4(A) and FIG. 4(B).

Buffer members 40 are members that are arranged with power storage devices 10 and receive the load in first direction X from power storage devices 10. FIG. 6 illustrates buffer member 40 disposed between adjacent first power storage device 10a and second power storage device 10b. Buffer member 40 includes hard part 42 having a predetermined hardness and soft part 44 softer than hard part 42.

The shape of hard part 42 changes by receiving a load of a predetermined magnitude or more. By hard part 42 changing its shape, buffer member 40 changes its state from a first state in which the load is received by hard part 42 to a second state in which the load is received by soft part 44. That is, hard part 42 and soft part 44 each receives the load in first direction X from power storage device 10 at different timings. Hard part 42 of the present exemplary embodiment has, as a structure for changing its own shape, vulnerable part 46 that breaks or plastically deforms by receiving a load of a predetermined magnitude or more. Thus, buffer member 40 changes from the first state to the second state by breakage or plastic deformation of vulnerable part 46.

Hard part 42 can be made of, for example, a metal or a hard resin such as polypropylene (PP), polybutylene terephthalate (PBT), polycarbonate (PC), and Noryl (registered trademark) resin (modified PPE). Hard part 42 of the present exemplary embodiment has an insulating property, and is provided to separator 12 as a part of separator 12. Thus, hard part 42 is made of a resin instead of a metal. In this case, hard part 42 can be integrally molded with separator 12.

Hard part 42 is provided on flat surface part 20 of separator 12. Separator 12 of the present exemplary embodiment has through-hole 20a penetrating flat surface part 20 in first direction X. An end, close to first power storage device 10a, of hard part 42 is disposed in through-hole 20a. In a state before vulnerable part 46 breaks or plastically deforms, hard part 42 protrudes toward exterior can 14 of second power storage device 10b from flat surface part 20.

Hard part 42 of the present exemplary embodiment has first part 48, second part 50, and third part 52. Vulnerable part 46 includes first vulnerable part 54 and second vulnerable part 56. First part 48 to third part 52, first vulnerable part 54, and second vulnerable part 56 are integrally molded.

In a state before vulnerable part 46 breaks or plastically deforms, first part 48 is positioned closer to first power storage device 10a than second part 50 and third part 52 are and separated from second power storage device 10b. First part 48 has a cylindrical shape, and an end close to first power storage device 10a is disposed in through-hole 20a. In the present exemplary embodiment, first part 48 and flat surface part 20 are integrally molded. Second part 50 is positioned closer to second power storage device 10b than first part 48 is, and is separated from first power storage device 10a. Second part 50 has a cylindrical shape having a diameter smaller than that of first part 48, and is disposed into first part 48 as viewed in first direction X. For example, first part 48 and second part 50 are disposed such that central axes thereof overlap with each other as viewed in first direction X.

An end of first part 48 close to second power storage device 10b and an end of second part 50 close to first power storage device 10a are connected to each other by first vulnerable part 54. First vulnerable part 54 is a part having a lower strength in first direction X than first part 48 and second part 50. For example, first vulnerable part 54 has a disk shape that is thinner in first direction X than first part 48 and second part 50, and has a hole with a diameter larger than that of second part 50. First vulnerable part 54 extends in parallel to the long side face of exterior can 14 of power storage device 10, and is positioned between first part 48 and second part 50 as viewed in first direction X. Second part 50 is disposed inside the hole of first vulnerable part 54 as viewed in first direction X.

Third part 52 is positioned closer to second power storage device 10b than second part 50 is, and is separated from first power storage device 10a. Third part 52 is disposed between second part 50 and second power storage device 10b in first direction X. Thus, second part 50 is separated not only from first power storage device 10a but also from second power storage device 10b. Third part 52 has a columnar shape having a diameter smaller than that of second part 50, and is disposed inside second part 50 as viewed in first direction X. For example, second part 50 and third part 52 are disposed such that central axes thereof overlap with each other as viewed in first direction X. The shape of third part 52 is not limited to a columnar shape. As long as third part 52 has a higher rigidity than second vulnerable part 56, third part 52 may be, for example, a cylindrical-shaped body of which end close to second power storage device 10b is closed, or a cylindrical-shaped body of which both ends in first direction X are opened.

An end of second part 50 close to second power storage device 10b and an end of third part 52 close to first power storage device 10a are connected to each other by second vulnerable part 56. Second vulnerable part 56 is a part having a lower strength in first direction X than second part 50 and third part 52. For example, second vulnerable part 56 has a disk shape which is thinner in first direction X than second part 50 and third part 52, and has a hole having a diameter larger than that of third part 52 in the center. Second vulnerable part 56 extends in parallel to the long side face of exterior can 14 of power storage device 10, and is positioned between second part 50 and third part 52 as viewed in first direction X. Third part 52 is disposed inside the hole of second vulnerable part 56 as viewed in first direction X.

Dimensions of third part 52, second part 50, and first part 48 in a direction perpendicular to first direction X, that is, in a direction along a YZ plane, are in descending order. That is, with respect to the dimension in the direction perpendicular to first direction X of the hard part 42, the dimension of a part close to second power storage device 10b is smaller than the dimension of a part close to first power storage device 10a. With this configuration, third part 52 can be separated from soft part 44 further than second part 50 and first part 48 are. In addition, second part 50 can be separated from soft part 44 further than first part 48 is. More specifically, the distance from the inner peripheral surface of through-hole 58 described later to third part 52 can be set longer than the distance from the inner peripheral surface to second part 50 and the distance from the inner peripheral surface to first part 48. In addition, the distance from the inner peripheral surface to second part 50 can be made longer than the distance from the inner peripheral surface to first part 48. With this configuration, a chance of hard part 42 of which shape has changed pressing soft part 44 can be reduced. As a result, when soft part 44 compressively deforms in the second state, happening of hard part 42 hindering the deformation of soft part 44 can be suppressed. Thus, the change in compression margin of soft part 44 is suppressed.

Buffer member 40 includes a plurality of hard parts 42. Each of hard parts 42 of the present exemplary embodiment is disposed so as to overlap with electrode body 38 included in power storage device 10 as viewed in first direction X. In addition, the plurality of hard parts 42 is arranged so as to be uniformly dispersed on flat surface part 20 at predetermined distances therebetween.

Soft part 44 can be made of a soft resin such as urethane foam. Soft part 44 is, for example, a sheet body, and is disposed parallel to flat surface part 20 of separator 12. Soft part 44 is disposed closer to second power storage device 10b than flat surface part 20 is. A part of soft part 44 overlapping with flat surface part 20 in first direction X is separated from first power storage device 10a, because flat surface part 20 is disposed between the part and first power storage device 10a. Soft part 44 has at least one through-hole 58 at a location overlapping with hard part 42 as viewed in first direction X. Soft part 44 of the present exemplary embodiment has through-holes 58 of which number is the same as the number of hard parts 42. Each through-hole 58 penetrates the sheet body in first direction X. Hard part 42 is inserted in through-hole 58, and a distal end close to second power storage device 10b protrudes from soft part 44 in first direction X. The part of hard part 42 except the distal end is disposed in through-hole 58.

Entire hard part 42 of the present exemplary embodiment is separated from the inner peripheral surface of through-hole 58. With this configuration, hard part 42 of which shape has been changed pressing the inner peripheral surface of through-hole 58 can be suppressed. Accordingly, in the second state, hindering of deformation of soft part 44 can be suppressed. When hard part 42 is separated from at least a part of inner peripheral surface of through-hole 58, hard part 42 hindering the deformation of soft part 44 can be suppressed at some degree. Soft part 44 may not have a sheet shape, and may be formed of, for example, a plurality of block bodies disposed around hard part 42.

No soft part 44 is disposed between hard part 42 and power storage device 10 in first direction X. In the present exemplary embodiment, no soft part 44 is disposed between hard part 42 and first power storage device 10a nor between hard part 42 and second power storage device 10b. This configuration can suppress, in the first state, soft part 44 taking up a load which is to be applied to hard part 42.

Figure 7:
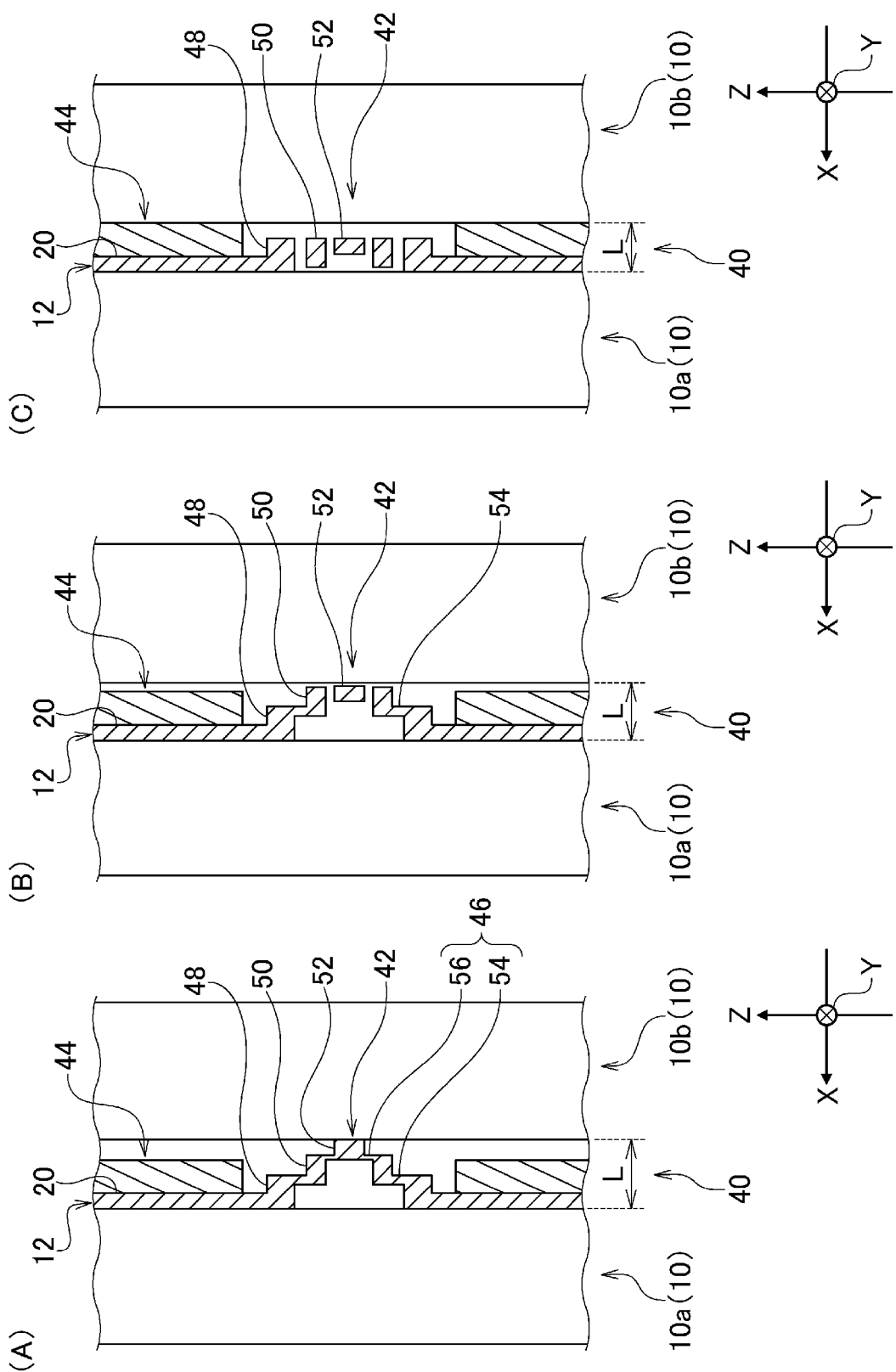
FIG. 7(A) to FIG. 7(C) are cross-sectional views schematically illustrating the buffer member changing its shape by receiving loads from the power storage devices.

FIG. 7(A) to FIG. 7(C) are cross-sectional views schematically illustrating buffer member 40 changing its shape by receiving loads from power storage devices 10. FIG. 7(B) exemplarily illustrates a state in which second vulnerable part 56 is broken, and FIG. 7(C) exemplarily illustrates a state in which first vulnerable part 54 is broken. In FIG. 7(A) to FIG. 7(C), illustration of electrode body 38 is omitted.

First vulnerable part 54 and second vulnerable part 56 are designed such that one has lower strength than the other. In the present exemplary embodiment, second vulnerable part 56 is thinner in first direction X than first vulnerable part 54 and has a lower strength than first vulnerable part 54. Thus, when hard part 42 receives a load in first direction X due to the expansion of power storage device 10, second vulnerable part 56 breaks or plastically deforms first, and then, first vulnerable part 54 breaks or plastically deforms.

With respect to the dimension (thickness) in first direction X, the dimension of hard part 42 is larger than the dimension of soft part 44 in a state before vulnerable part 46 breaks or plastically deforms. Thus, as illustrated in FIG. 7(A), before first vulnerable part 54 and second vulnerable part 56 break or plastically deform, third part 52 abuts on exterior can 14 of second power storage device 10b, and hard part 42 receives the load from power storage device 10. That is, buffer member 40 is in the first state, and hard part 42 restricts first power storage device 10a and second power storage device 10b approaching each other.

As illustrated in FIG. 7(B), when second vulnerable part 56 breaks or plastically deforms, third part 52 falls into the inside of second part 50, and the dimension of hard part 42 decreases. That is, hard part 42 contracts in first direction X by breakage or plastic deformation of second vulnerable part 56. However, in a state where first vulnerable part 54 has broken or plastically deformed, the dimension of hard part 42 is still larger than the dimension of soft part 44. Thus, exterior can 14 of second power storage device 10b abuts on second part 50, and hard part 42 receives the load from power storage device 10. Thus, buffer member 40 continues to be in the first state, and hard part 42 restricts first power storage device 10a and second power storage device 10b approaching each other. In this state, distance L between first power storage device 10a and second power storage device 10b is smaller than before first vulnerable part 54 and second vulnerable part 56 breaks or plastically deforms.

As illustrated in FIG. 7(C), when first vulnerable part 54 also breaks or plastically deforms in addition to the breakage or plastic deformation of second vulnerable part 56, second part 50 falls into the inside of first part 48, and the dimension of hard part 42 further decreases. That is, hard part 42 contracts in first direction X by breakage or plastic deformation of first vulnerable part 54. Accordingly, hard part 42 of the present exemplary embodiment contracts by two steps by second vulnerable part 56 having a low strength breaking or plastically deforming, and then first vulnerable part 54 having a high strength breaking or plastically deforming. As a result, the dimension of hard part 42 becomes smaller than the dimension of soft part 44, and exterior can 14 of second power storage device 10b abuts on soft part 44, so that soft part 44 receives the load from power storage device 10. That is, buffer member 40 is in the second state, and soft part 44 restricts first power storage device 10a and second power storage device 10b approaching each other. At this time, distance L between first power storage device 10a and second power storage device 10b is smaller than before second vulnerable part 56 breaks or plastically deforms.

As described above, regarding the dimensions in first direction X of hard part 42 and soft part 44, hard part 42 is larger than soft part 44 in the first state, and soft part 44 is larger than hard part 42 in the second state. Thus, in the first state, soft part 44 is separated from second power storage device 10b, and in the second state, hard part 42 is separated from second power storage device 10b. That is, in the first state, distance L between first power storage device 10a and second power storage device 10b is defined by the dimension of hard part 42, and in the second state, distance L is defined by the dimension of soft part 44. Accordingly, when buffer member 40 is in the first state, hard part 42 can further reliably receive the load from power storage device 10. When buffer member 40 is in the second state, soft part 44 can further reliably receive the load from power storage device 10.

Dimensions of first part 48 to third part 52 are smaller than the dimension of soft part 44. This configuration can suppress, in the second state where soft part 44 abuts on second power storage device 10b, hard part 42 of which shape has changed abutting on second power storage device 10b. As a result, uneven distribution of the load applied to soft part 44 can be suppressed.

FIG. 8(A) is a view illustrating the relationship between the compressive load and the compression ratio of buffer member 40 when hard part 42 is in the state illustrated in FIG. 7(A). FIG. 8(B) is a view illustrating the relationship between the compressive load and the compression ratio of buffer member 40 when hard part 42 is in the state illustrated in FIG. 7(B). FIG. 8(C) is a view illustrating the relationship between the compressive load and the compression ratio of buffer member 40 when hard part 42 is in the state illustrated in FIG. 7(C).

As illustrated in FIG. 8(A) to FIG. 8(C), the absorption amount (accepted amount) of expansion required of buffer member 40, that is, required absorption amount M1 is determined according to the amount of expansion of power storage devices 10. Lower limit compressive load N1 and upper limit compressive load N2 are defined for buffer member 40. Lower limit compressive load N1 is a load applied to buffer member 40 when the minimum load necessary for positioning power storage device 10, that is, a lower limit binding load, is applied to power storage devices 10. Upper limit compressive load N2 is the maximum load under which no damage to binding member 6 nor degradation in performance of power storage device 10 occurs, that is, a load applied to buffer member 40 when an upper limit binding load is applied to power storage devices 10. Thus, buffer member 40 is required to absorb necessary absorption amount M1 in the range from lower limit compressive load N1 to upper limit compressive load N2.

Load absorption characteristics of buffer member 40 differ among the state where third part 52 abuts on exterior can 14 of second power storage device 10b, the state where second part 50 abuts on exterior can 14 of second power storage device 10b, and the state where soft part 44 abuts on exterior can 14 of second power storage device 10b. The load absorption characteristics are determined based on the stress-strain curve unique to the material of the member receiving the load, the shape of the member receiving the load, and the like.

Hard part 42 is hard and has a small deformation amount compared to soft part 44. Thus, as illustrated in FIG. 8(A), in a state where third part 52 abuts on second power storage device 10b, lower limit compressive load N1 can be reached with a small compression ratio, whereas the compression ratio to reach upper limit compressive load N2 is also small. Thus, only absorption amount M2 within necessary absorption amount M1 can be absorbed. Similarly, as illustrated in FIG. 8(B), even in a state where second part 50 abuts on second power storage device 10b, lower limit compressive load N1 can be reached with a small compression ratio, whereas the compression ratio to reach upper limit compressive load N2 is also small. Thus, only absorption amount M3 within necessary absorption amount M1 can be absorbed.

In contrast, soft part 44 is soft and has a large deformation amount compared to hard part 42. Thus, in a state where soft part 44 abuts on second power storage device 10b, a compression ratio larger than that of hard part 42 is required until lower limit compressive load N1 is reached, whereas the compression ratio to reach upper limit compressive load N2 is also large. Thus, absorption amount M4 that is within necessary absorption amount M1 but larger than absorption amount M2 and absorption amount M3 can be absorbed.

Figure 9:
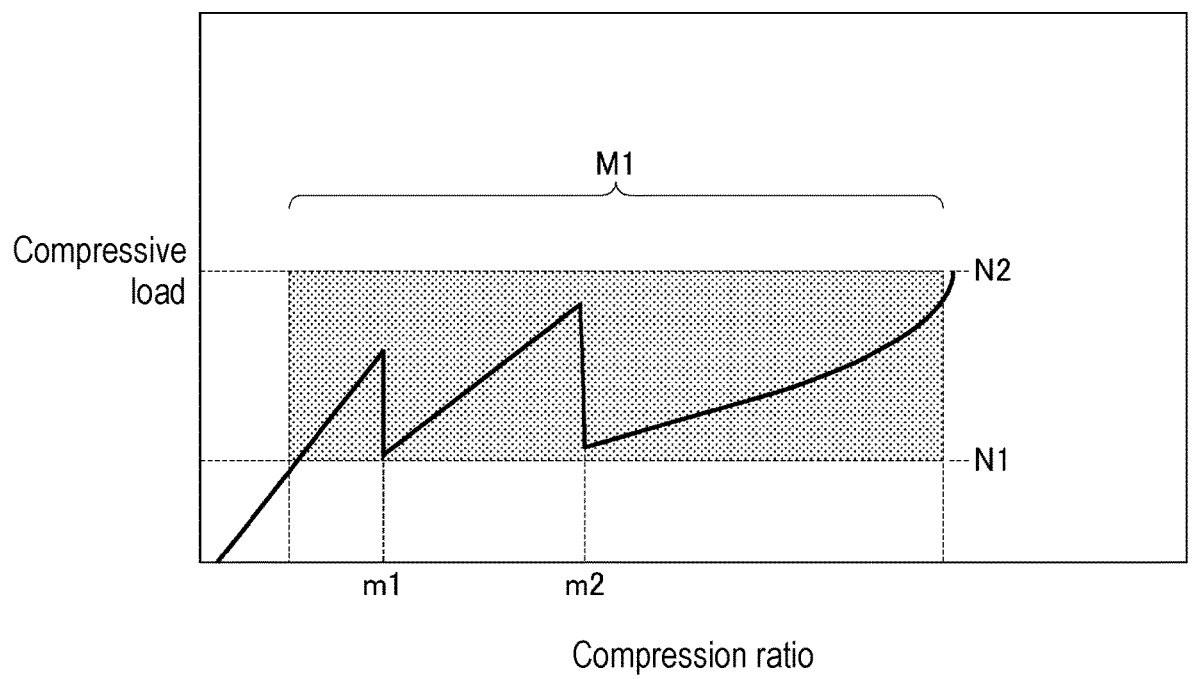
FIG. 9 is a view illustrating the relationship between the compressive load and the compression ratio of the buffer member in a first state and a second state.

FIG. 9 is a view illustrating the relationship between the compressive load and the compression ratio of buffer member 40 in the first state and the second state. For example, buffer member 40 is designed such that second vulnerable part 56 breaks when compression ratio m1 is reached, and first vulnerable part 54 breaks when compression ratio m2 is reached. While the amount of expansion of power storage devices 10 is relatively small and buffer member 40 is repeatedly compressed and released from compression in a range up to compression ratio m1, buffer member 40 is in the first state of receiving the load from second power storage device 10b by third part 52. Such a state can be observed, for example, at the initial stage of life of power storage device 10. The relationship between the compressive load applied to buffer member 40 and the compression ratio in this stage conforms to the relationship illustrated in FIG. 8(A).

When the load applied to buffer member 40 increases and the compression ratio of buffer member 40 reaches compression ratio m1, second vulnerable part 56 breaks. As a result, buffer member 40 changes its state to the first state in which second part 50 receives the load from second power storage device 10b. Then, while the amount of expansion of power storage devices 10 is at around a medium level and buffer member 40 is repeatedly compressed and released from compression in a range up to compression ratio m2, buffer member 40 is kept in the first state. Such a state is observed, for example, in the middle stage of life of power storage device 10. The relationship between the compressive load applied to buffer member 40 and the compression ratio in this stage conforms to the relationship illustrated in FIG. 8(B).

When the load applied to buffer member 40 increases and the compression ratio of buffer member 40 reaches compression ratio m2, first vulnerable part 54 breaks. As a result, buffer member 40 changes its state to the second state in which soft part 44 receives the load from second power storage device 10b. Then, while the amount of expansion of each power storage device 10 is large and buffer member 40 is repeatedly compressed and released from compression in a range from compression ratio m2 and higher, buffer member 40 is kept in the second state. Such a situation is observed, for example, in the end stage of life of power storage device 10. At this time, the relationship between the compressive load applied to buffer member 40 and the compression ratio conforms to the relationship illustrated in FIG. 8(C).

As described above, buffer member 40 of the present exemplary embodiment has a structure that changes it shape by the load from power storage device 10, and receives a relatively small load by hard part 42 and a relatively large load by soft part 44. That is, buffer member 40 switches, by steps, the flexibility and the amount of dimensional change of a part receiving the load according to the magnitude of the load. As a result, as illustrated in FIG. 9, necessary absorption amount M1 required of buffer member 40 is secured while maintaining the load range from lower limit compressive load N1 to upper limit compressive load N2.

As described above, power storage module 1 according to the present exemplary embodiment includes at least one power storage device 10, and buffer member 40 arranged with power storage device 10 in first direction X. Buffer member 40 includes hard part 42 and soft part 44 which receive a load in first direction X from power storage device 10. The shape of hard part 42 changes by receiving a load of a predetermined magnitude or more. By hard part 42 changing its shape, buffer member 40 changes its state from the first state in which the load is received by hard part 42 to the second state in which the load is received by soft part 44. With this configuration, in the initial stage of life where power storage device 10 is thin, hard part 42 of which deformation amount is small receives the load, so that the binding force necessary for positioning power storage device 10 can be maintained. In contrast, in the end stage of life where power storage device 10 is thick, soft part 44 of which deformation amount is large receives the load, and power storage device 10 can be held with a low binding force within such a range that does not cause damage to binding member 6.

Thus, according to the present exemplary embodiment, even when the amount of expansion of power storage device 10 increases with the increase in capacity of power storage device 10, both absorption of expansion and positioning of power storage device 10 can be achieved at a high level. In addition, even when the amount of expansion of power storage device 10 differs between the initial stage of life and the end stage of life, power storage device 10 can be held with an appropriate binding force in accordance with the amount of expansion in each step. Consequently, reliability of power storage module 1 can be enhanced.

In addition, an increase in strength of binding member 6 can be avoided, so that an increase in size, weight, cost, and the like of binding member 6 and hence those of power storage module 1 can be suppressed. In addition, deterioration in the performance and shortening of the life of power storage device 10 due to an increase in the load applied to power storage device 10 can be suppressed. Furthermore, for example, when necessary absorption amount M1 is to be absorbed only by soft part 44, the thickness in first direction X of buffer member 40 needs to be increased, which leads to an increase in size of entire power storage module 1. In contrast, according to buffer member 40 of the present exemplary embodiment, the necessary absorption amount M1 can be absorbed without increasing the thickness of buffer member 40. Accordingly, buffer member 40 can be made thinner, and hence power storage module 1 can be downsized.

Regarding the thicknesses of hard part 42 and soft part 44 in first direction X, hard part 42 is thicker than soft part 44 in the first state, and soft part 44 is thicker than hard part 42 in the second state. Thus, when buffer member 40 is in the first state, hard part 42 can more reliably receive the load, and when buffer member 40 is in the second state, soft part 44 can more reliably receive the load. Accordingly, both absorption of expansion and positioning of power storage device 10 can be further reliably achieved.

Hard part 42 has vulnerable part 46 that breaks or plastically deforms by receiving a load of a predetermined magnitude or more. Buffer member 40 changes its state from the first state to the second state by breakage or plastic deformation of vulnerable part 46. Accordingly, both absorption of expansion and positioning of power storage device 10 can be achieved with a simple configuration.

Furthermore, power storage module 1 includes first power storage device 10a and second power storage device 10b which are adjacent to each other. Hard part 42 before breaking or plastically deforming includes first part 48 located close to first power storage device 10a, among first power storage device 10a and second power storage device 10b, and separated from second power storage device 10b, and second part 50 that is located closer to second power storage device 10b than first part 48 is and separated from first power storage device 10a. Vulnerable part 46 includes first vulnerable part 54 that connects first part 48 to second part 50 and has a strength lower than that of first part 48 and second part 50. Hard part 42 contracts in first direction X by first vulnerable part 54 breaking or plastically deforming. Accordingly, both absorption of expansion and positioning of power storage device 10 can be achieved with a simple configuration.

In the present exemplary embodiment, hard part 42 before breaking or plastically deforming has third part 52 that is located closer to second power storage device 10b than second part 50 is and separated from first power storage device 10a. Vulnerable part 46 includes second vulnerable part 56 that connects second part 50 to third part 52 and has a strength lower than that of second part 50 and third part 52. One of first vulnerable part 54 and second vulnerable part 56 has a lower strength than that of the other. Hard part 42 contracts by two steps by vulnerable part 46 having a low strength breaking or plastically deforming, followed by vulnerable part 46 having a high strength breaking or plastically deforming. Accordingly, both absorption of expansion and positioning of power storage device 10 can be achieved at a higher level.

When second vulnerable part 56 breaks, third part 52 separates from second part 50 and is accommodated in second part 50 or first part 48. When first vulnerable part 54 breaks, second part 50 separates from first part 48, and third part 52 and second part 50 are accommodated in first part 48. As a result, when buffer member 40 changes its state from the first state to the second state, the dimension of hard part 42 more reliably becomes smaller than the dimension of soft part 44. When second vulnerable part 56 plastically deforms, third part 52 is accommodated in second part 50 or first part 48 with third part 52 connected to second part 50. When first vulnerable part 54 plastically deforms, third part 52 and second part 50 are accommodated in first part 48 with second part 50 connected to first part 48.

Hard part 42 of the present exemplary embodiment has an insulating property, is provided on separator 12 which insulates power storage device 10 from the outside (for example, adjacent power storage device 10, end plate 4, binding member 6, etc.), and constitutes a part of separator 12. Thus, hard part 42 can be installed easily. In addition, an increase in the number of parts of power storage module 1 provided with buffer member 40 can be suppressed. Furthermore, hard part 42 is disposed so as to overlap with electrode body 38 as viewed in first direction X. Accordingly, the expansion of power storage device 10 can be more reliably absorbed by buffer member 40. Thus, the load applied to binding member 6 can be more reliably reduced.

First Modified Example

In the first exemplary embodiment, hard part 42 includes first vulnerable part 54 and second vulnerable part 56, and contracts by two steps, but the present invention is not limited to such a configuration. Hard part 42 may have first part 48, second part 50, and first vulnerable part 54, and first part 48 may abut on first power storage device 10a and second part 50 may abut on second power storage device 10b. In this case, hard part 42 contracts by a single step by breakage or plastic deformation of first vulnerable part 54.

Second Modified Example

In the first exemplary embodiment, in a state where only second vulnerable part 56 has broken or plastically deformed, the dimension of hard part 42 is larger than the dimension of soft part 44, but the present invention is not limited to this configuration. The dimension of soft part 44 may be larger than the dimension of hard part 42 in a state where only second vulnerable part 56 has broken or plastically deformed.

Third Modified Example

In the first exemplary embodiment, the strength of second vulnerable part 56 is lower than that of first vulnerable part 54, and after third part 52 is displaced by the breakage or the like of second vulnerable part 56, second part 50 is displaced by the breakage or the like of first vulnerable part 54, but the present invention is not limited to this configuration. It may be configured that first vulnerable part 54 has a lower strength than second vulnerable part 56, and after second part 50 and third part 52 are displaced by breakage or the like of first vulnerable part 54, third part 52 is displaced by breakage or the like of second vulnerable part 56.

Second Exemplary Embodiment

A second exemplary embodiment has a configuration common to that of the first exemplary embodiment except for the shape of hard part 42. Hereinafter, the present exemplary embodiment will be described mainly on a configuration different from that of the first exemplary embodiment, and common configurations will be briefly described or not described.

Figure 10:
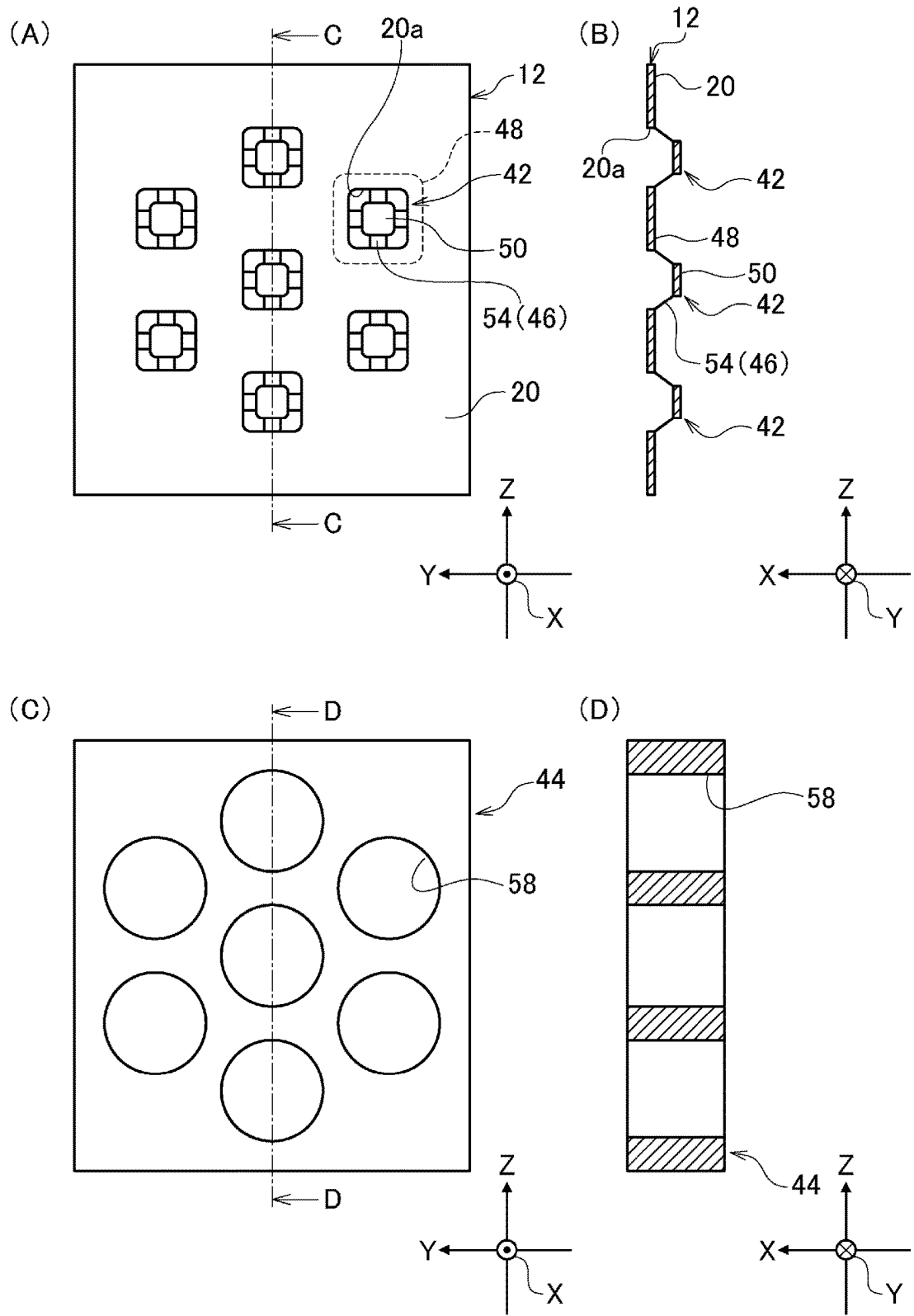
FIG. 10(A) is a front view of a hard part included in a buffer member according to a second exemplary embodiment.
FIG. 10(B) is a cross-sectional view taken along line C-C in FIG. 10(A).
FIG. 10(C) is a front view of a soft part included in the buffer member.
FIG. 10(D) is a cross-sectional view taken along line D-D in FIG. 10(C).
Figure 11:
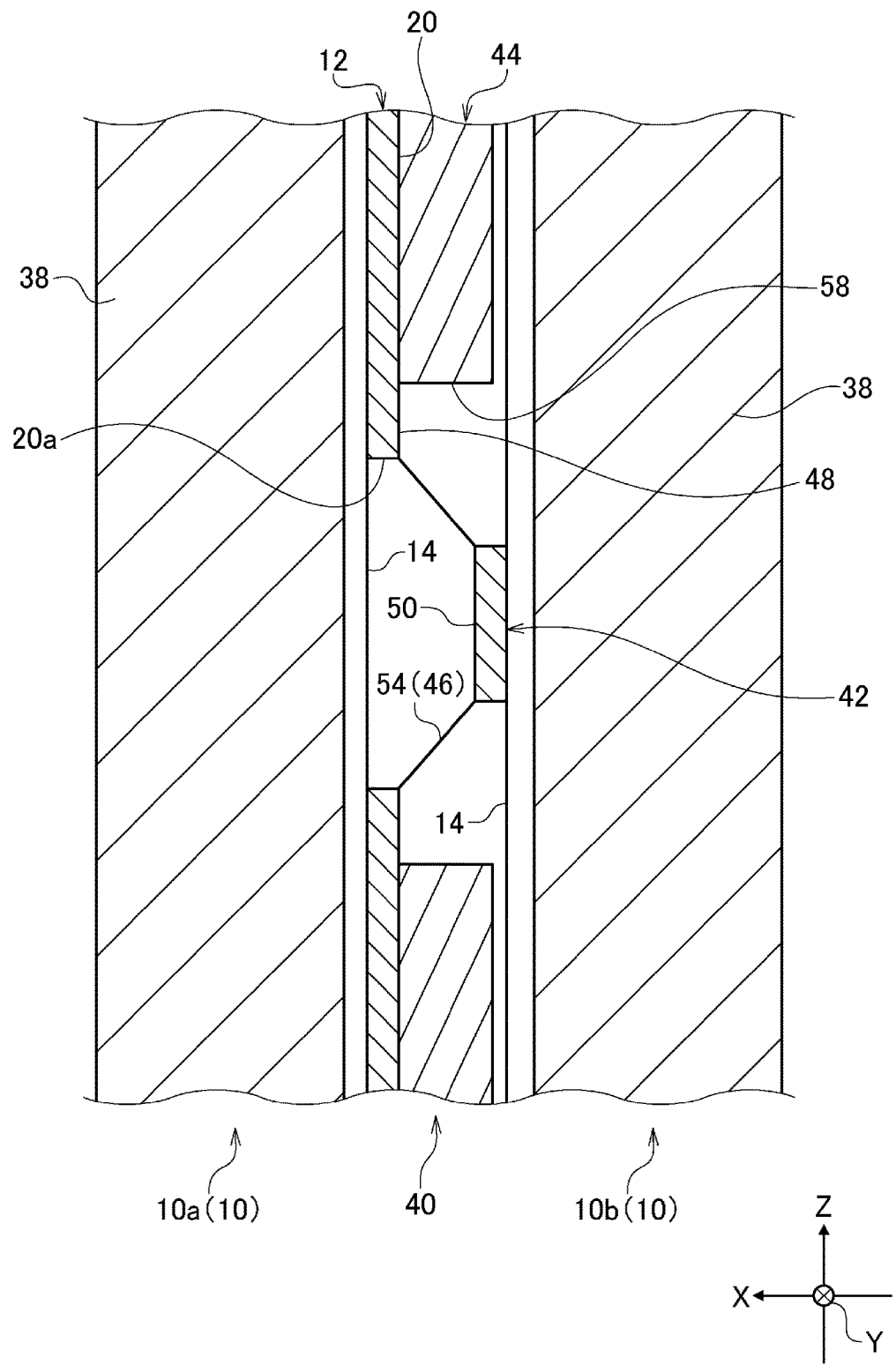
FIG. 11 is a cross-sectional view of the buffer member sandwiched between two adjacent power storage devices.

FIG. 10(A) is a front view of hard parts 42 included in buffer member 40 according to the second exemplary embodiment. FIG. 10(B) is a cross-sectional view taken along line C-C in FIG. 10(A). FIG. 10(C) is a front view of soft part 44 included in buffer member 40. FIG. 10(D) is a cross-sectional view taken along line D-D in FIG. 10(C). FIG. 11 is a cross-sectional view of buffer member 40 sandwiched between two adjacent power storage devices 10. Illustration of wall part 22 is omitted in FIG. 10(A) and FIG. 10(B).

Buffer member 40 includes hard parts 42 and soft part 44. By hard part 42 changing its shape, buffer member 40 changes its state from a first state in which the load is received by hard part 42 to a second state in which the load is received by soft part 44. Hard part 42 of the present exemplary embodiment has vulnerable part 46 as a structure for changing the shape of hard part 42.

Hard part 42 includes first part 48 and second part 50. Vulnerable part 46 includes first vulnerable part 54. First part 48, first vulnerable part 54, and second part 50 are integrally molded. Separator 12 has through-holes 20a each having a substantially square shape and penetrating flat surface part 20 in first direction X, and the peripheral rim of through-hole 20a constitutes first part 48. Thus, first part 48 is positioned closer to first power storage device 10a than second part 50 is, and is separated from second power storage device 10b. In the present exemplary embodiment, first part 48 abuts on exterior can 14 of first power storage device 10a.

Second part 50 is positioned closer to second power storage device 10b than first part 48 is, and is separated from first power storage device 10a. In the present exemplary embodiment, second part 50 abuts on exterior can 14 of second power storage device 10b. Second part 50 is a small, substantially square-shaped, flat plate having a shape similar to that of through-hole 20a, and is disposed into through-hole 20a as viewed in first direction X with its posture determined such that each side thereof is parallel to a side of through-hole 20a.

First part 48 and second part 50 are connected to each other by first vulnerable parts 54. First vulnerable part 54 is a part having a lower strength in first direction X than first part 48 and second part 50. Hard part 42 of the present exemplary embodiment has four first vulnerable parts 54. Each first vulnerable part 54 is a flat plate thinner than first part 48 and second part 50, and has one side connected to a rim (side) of the peripheral rim of through-hole 20a and the other side connected to a rim of second part 50, the rim facing the rim of through-hole 20a to which first vulnerable part 54 is connected. Each first vulnerable parts 54 extends from first part 48 toward second power storage device 10b so as to be nearer, as approaching second power storage device 10b, to the center of through-hole 20a. Each rim of second part 50 is connected to the distal end of corresponding first vulnerable part 54.

Soft part 44 can be made of a material similar to that of soft part 44 of the first exemplary embodiment. The shape of soft part 44 is similar to that of soft part 44 of the first exemplary embodiment.

Figure 12:
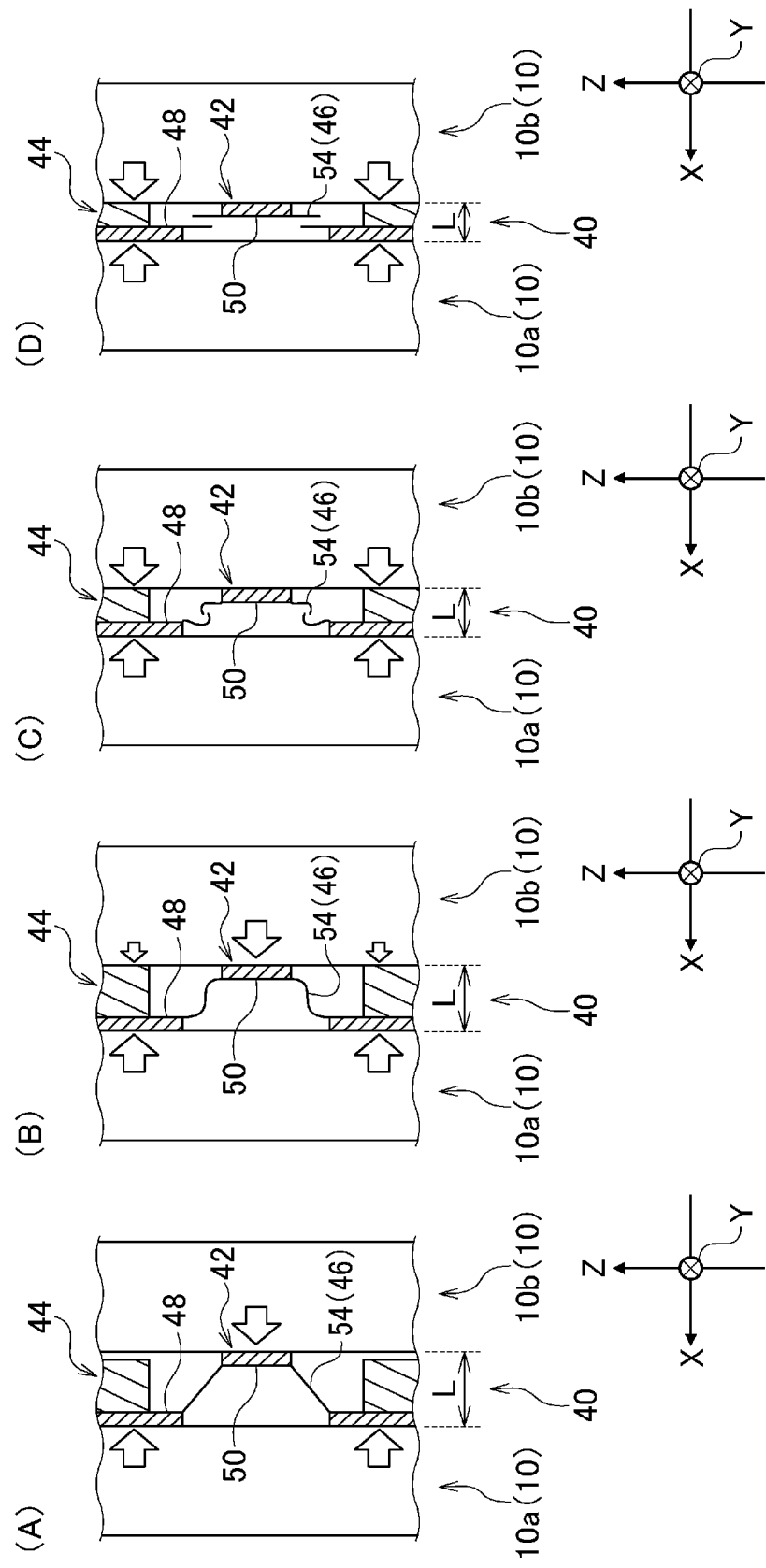
FIG. 12(A) to FIG. 12(D) are cross-sectional views schematically illustrating the buffer member changing its shape by receiving loads from the power storage devices.

FIG. 12(A) to FIG. 12(D) are cross-sectional views schematically illustrating buffer member 40 changing its shape by receiving loads from power storage devices 10. FIG. 12(C) exemplarily illustrates a state in which first vulnerable part 54 has broken. In FIG. 12(A) to FIG. 12(D), illustration of electrode body 38 is omitted.

With respect to the dimension in first direction X, the dimension of hard part 42 is larger than the dimension of soft part 44 in a state before vulnerable part 46 breaks or plastically deforms. Thus, as illustrated in FIG. 12(A), in a state before first vulnerable part 54 breaks or plastically deforms, second part 50 abuts on exterior can 14 of second power storage device 10b, and hard part 42 receives a load from power storage device 10. That is, buffer member 40 is in the first state.

As illustrated in FIG. 12(B), when the load from power storage device 10 increases, first vulnerable part 54 curves, and displacement of first part 48 and second part 50 starts in first direction X to approach each other. That is, buffer member 40 starts to change its state from the first state to the second state. Now, exterior can 14 of second power storage device 10b abuts also on soft part 44, and a load may be applied also to soft part 44. The load received by soft part 44 is smaller than the load received by hard part 42.

As curving of first vulnerable part 54 progresses, first vulnerable part 54 breaks or plastically deforms as illustrated in FIG. 12(C). As a result, hard part 42 contracts in first direction X, and the dimension of hard part 42 becomes smaller than the dimension of soft part 44. As a result, as illustrated in FIG. 12(D), buffer member 40 is now in the second state in which soft part 44 receives the load from power storage device 10.

An effect similar to that of the first exemplary embodiment can be obtained also by buffer member 40 of the present exemplary embodiment. Note that, buffer member 40 of the present exemplary embodiment may also have a structure that contracts by two steps as in the first exemplary embodiment.

Fourth Modified Example

In the second exemplary embodiment, first vulnerable parts 54 are connected to the four sides of substantially square shaped second part 50, but the present invention is not limited to this configuration. For example, first vulnerable parts 54 may be connected only to two opposing sides of second part 50.

Third Exemplary Embodiment

A third exemplary embodiment has a configuration common to that of the first exemplary embodiment except for the shape of hard part 42. Hereinafter, the present exemplary embodiment will be described mainly on a configuration different from that of the first exemplary embodiment, and common configurations will be briefly described or not described.

Figure 13:
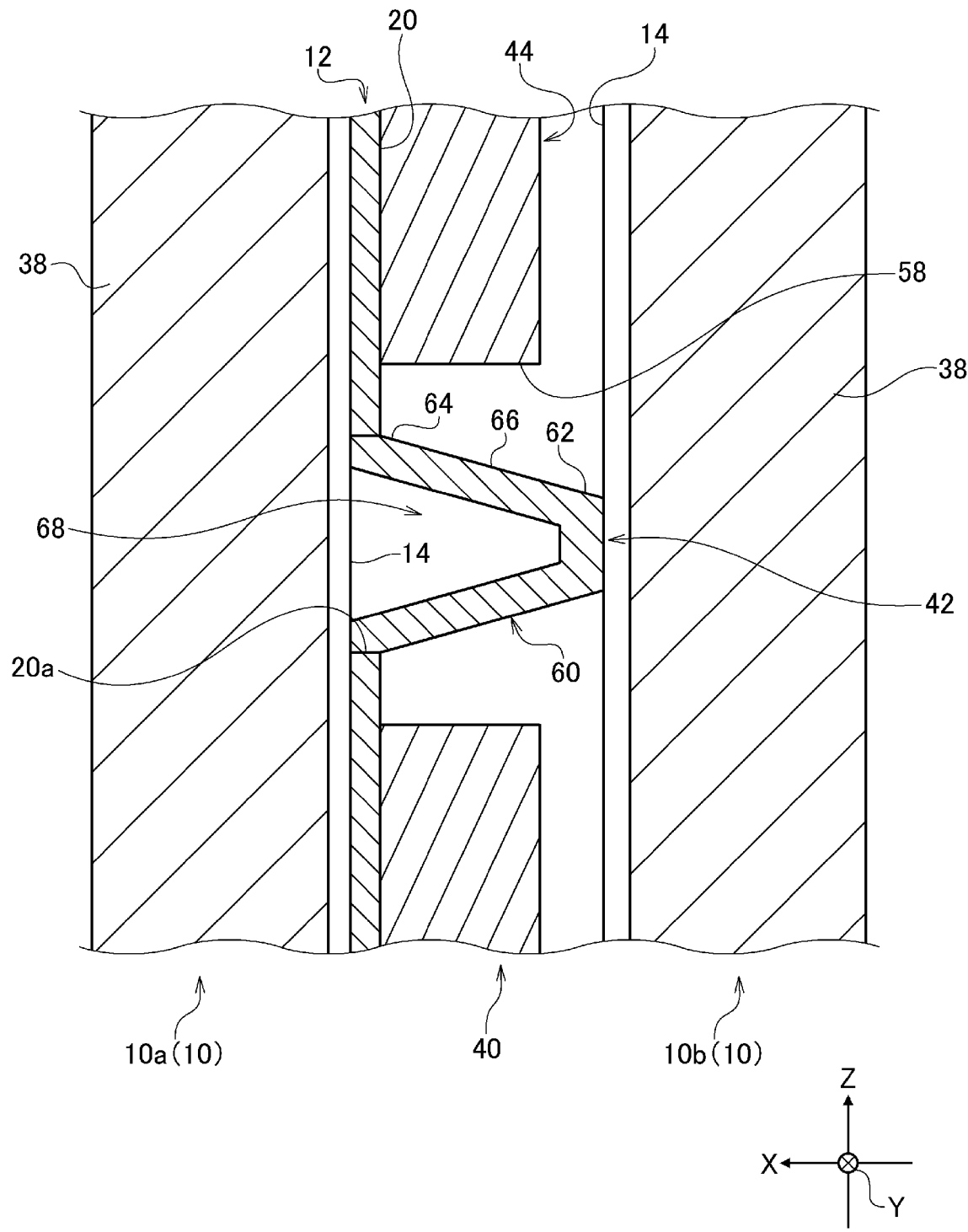
FIG. 13 is a cross-sectional view of a buffer member according to a third exemplary embodiment sandwiched between two adjacent power storage devices.

FIG. 13 is a cross-sectional view of buffer member 40 according to the third exemplary embodiment sandwiched between two adjacent power storage devices 10. Buffer member 40 includes hard parts 42 and soft part 44. By hard part 42 changing its shape, buffer member 40 changes its state from a first state in which the load is received by hard part 42 to a second state in which the load is received by soft part 44. Hard part 42 of the present exemplary embodiment has hollow protrusion 60 as a structure for changing the shape of hard part 42.

Protrusion 60 can be made of an elastic material such as rubber. Protrusion 60 of the present exemplary embodiment has a hollow truncated cone shape, and includes top part 62, base part 64, side wall part 66, and hollow part 68. Protrusion 60 is disposed on flat surface part 20 of separator 12 so as top part 62 and base part 64 to be arranged in first direction X. Flat surface part 20 has through-hole 20a, and protrusion 60 protrudes from flat surface part 20 toward exterior can 14 of second power storage device 10b with base part 64 disposed in through-hole 20a. In the present exemplary embodiment, base part 64 abuts on exterior can 14 of first power storage device 10a, and top part 62 abuts on exterior can 14 of second power storage device 10b.

Top part 62 and base part 64 are connected to each other by side wall part 66. Side wall part 66 is a part having a strength in first direction X lower than those of top part 62 and base part 64. Thus, side wall part 66 corresponds to vulnerable part 46. Hollow part 68 is a space defined by top part 62, base part 64, and side wall part 66. Hollow part 68 is opened via through-hole 20a. That is, protrusion 60 has a protruding part protruding toward second power storage device 10b, and the surface of the protruding part facing first power storage device 10a is recessed toward second power storage device 10b. This recess constitutes hollow part 68.

Soft part 44 can be made of a material similar to that of soft part 44 of the first exemplary embodiment. The shape of soft part 44 is similar to that of soft part 44 of the first exemplary embodiment.

Figure 14:
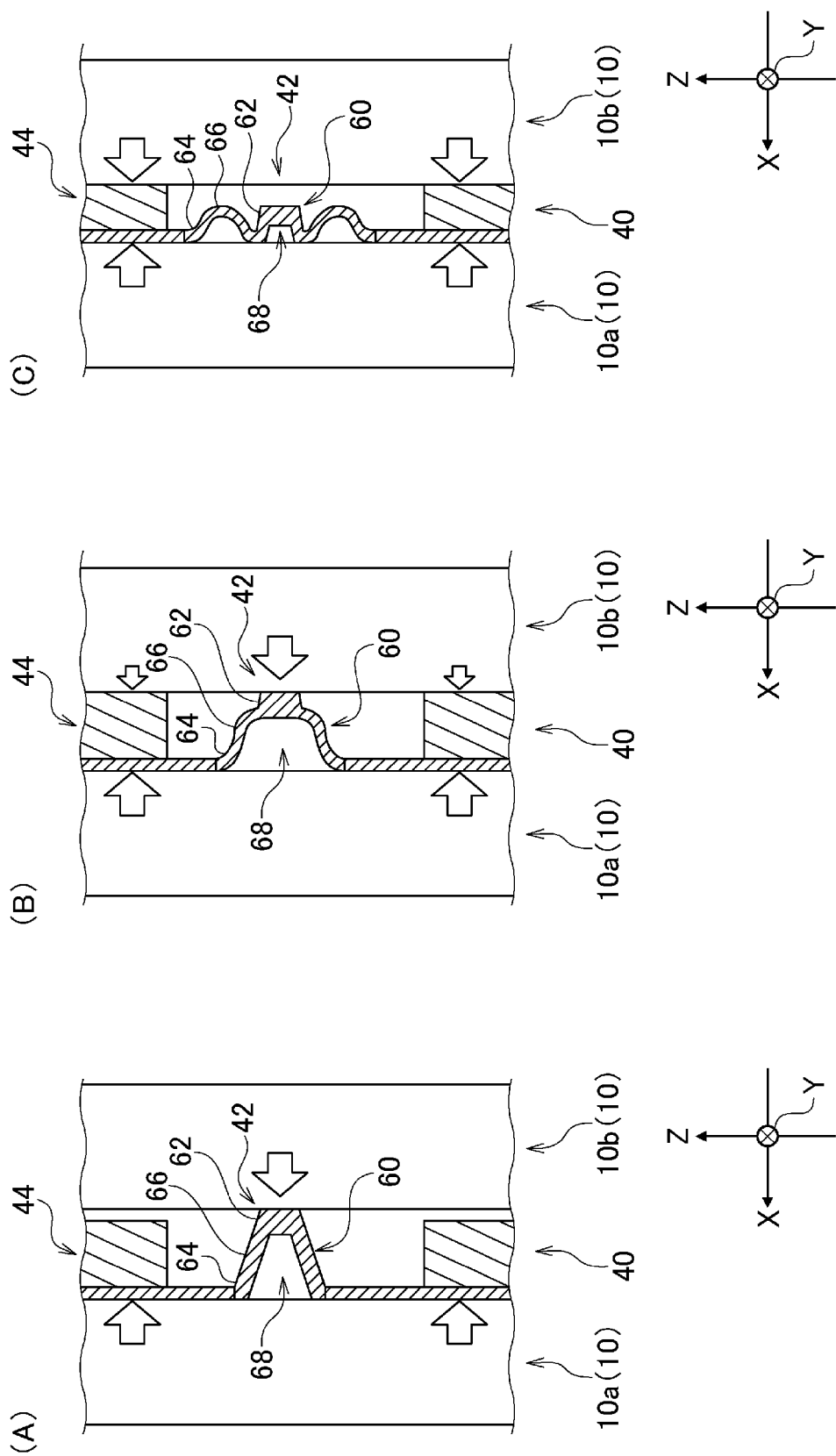
FIG. 14(A) to FIG. 14(C) are cross-sectional views schematically illustrating the buffer member changing its shape by receiving loads from the power storage devices.

FIG. 14(A) to FIG. 14(C) are cross-sectional views schematically illustrating buffer member 40 changing its shape by receiving loads from power storage devices 10. In FIG. 14(A) to FIG. 14(C), illustration of electrode body 38 is omitted.

With respect to the dimension in first direction X, the dimension of protrusion 60 before deforming is larger than the dimension of soft part 44. Thus, as illustrated in FIG. 14(A), in a state before protrusion 60 deforms, top part 62 abuts on exterior can 14 of second power storage device 10b, and protrusion 60 receives a load from power storage device 10. That is, buffer member 40 is in the first state.

As illustrated in FIG. 14(B), when the load from power storage device 10 increases, side wall part 66 curves, and displacement of top part 62 and base part 64 starts in first direction X to approach each other. That is, buffer member 40 starts to change its state from the first state to the second state. Now, exterior can 14 of second power storage device 10b abuts also on soft part 44, and a load may be applied also to soft part 44. The load received by soft part 44 is smaller than the load received by hard part 42.

When protrusion 60 receives a load of a predetermined magnitude or more from power storage device 10, as illustrated in FIG. 14(C), side wall part 66 curves so as to be bent inward, and top part 62 falls into hollow part 68. That is, protrusion 60 contracts in first direction X by top part 62 entering hollow part 68, resulting in the shape of protrusion 60 partially inverting. As a result, the dimension of hard part 42 becomes smaller than the dimension of soft part 44, and buffer member 40 is now in the second state in which soft part 44 receives the load from power storage device 10.

An effect similar to that of the first exemplary embodiment can be obtained also by buffer member 40 of the present exemplary embodiment. Note that, buffer member 40 of the present exemplary embodiment may also have a structure that contracts by two steps as in the first exemplary embodiment.

Fourth Exemplary Embodiment

A fourth exemplary embodiment has a configuration common to that of the first exemplary embodiment except for the shape of hard part 42. Hereinafter, the present exemplary embodiment will be described mainly on a configuration different from that of the first exemplary embodiment, and common configurations will be briefly described or not described.

Figure 15:
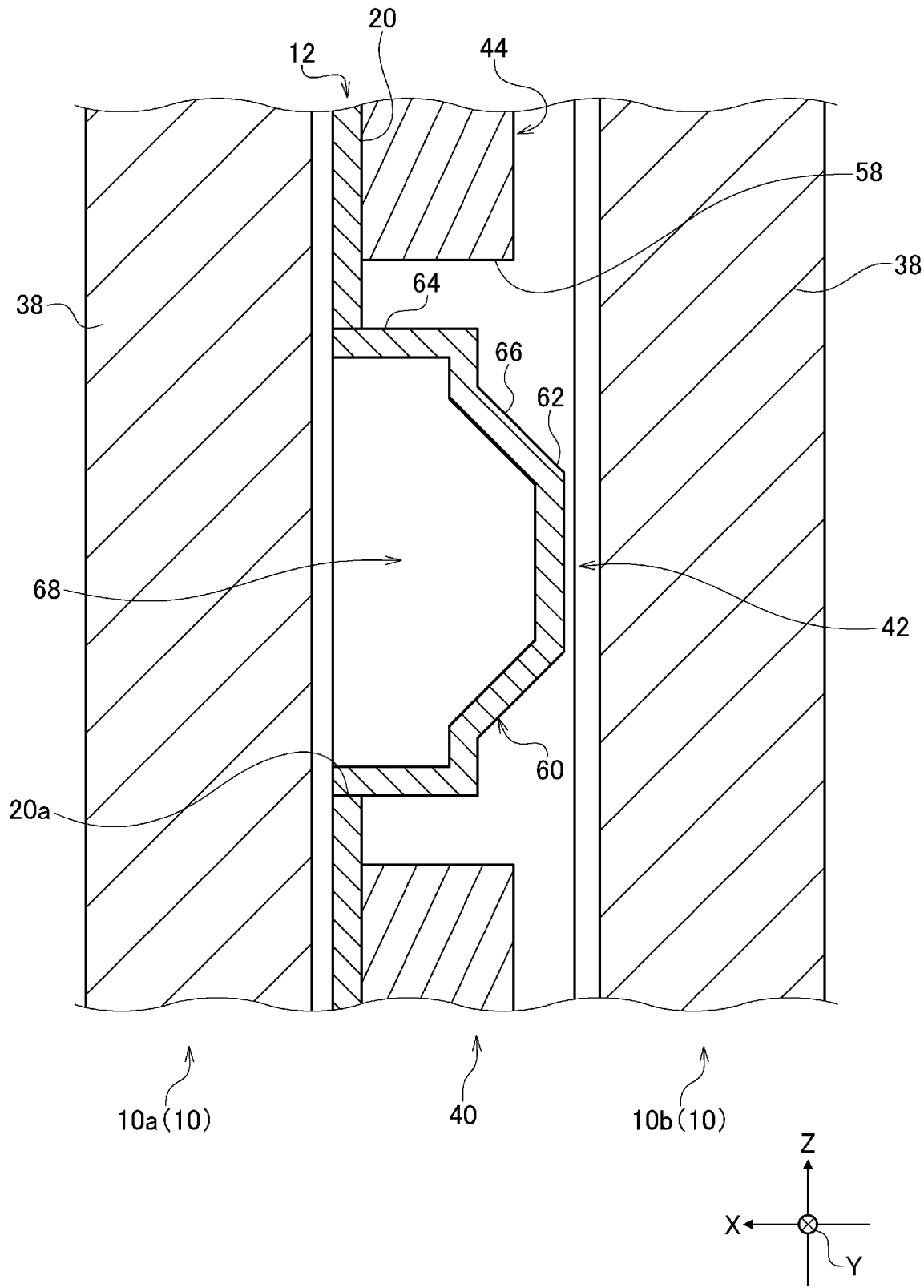
FIG. 15 is a cross-sectional view of a buffer member according to a fourth exemplary embodiment sandwiched between two adjacent power storage devices.

FIG. 15 is a cross-sectional view of buffer member 40 according to the fourth exemplary embodiment sandwiched between two adjacent power storage devices 10. Buffer member 40 includes hard parts 42 and soft part 44. By hard part 42 changing its shape, buffer member 40 changes its state from a first state in which the load is received by hard part 42 to a second state in which the load is received by soft part 44. Hard part 42 of the present exemplary embodiment has hollow protrusion 60 as a structure for changing the shape of hard part 42.

Protrusion 60 can be made of a metal or the like. Protrusion 60 of the present exemplary embodiment has a hollow dome shape and includes top part 62, base part 64, side wall part 66, and hollow part 68. Protrusion 60 is disposed on flat surface part 20 of separator 12 so as top part 62 and base part 64 to be arranged in first direction X. Flat surface part 20 has through-hole 20a, and protrusion 60 protrudes from flat surface part 20 toward exterior can 14 of second power storage device 10b with base part 64 disposed in through-hole 20a. In the present exemplary embodiment, base part 64 abuts on exterior can 14 of first power storage device 10a, and top part 62 abuts on exterior can 14 of second power storage device 10b.

Top part 62 and base part 64 are connected to each other by side wall part 66. Side wall part 66 is a part having a strength in first direction X lower than those of top part 62 and base part 64. Thus, side wall part 66 corresponds to vulnerable part 46. Base part 64 extends parallel to first direction X, and side wall part 66 extends obliquely with respect to first direction X from the end of base part 64. Hollow part 68 is a space defined by top part 62, base part 64, and side wall part 66. Hollow part 68 is opened via through-hole 20a.

Soft part 44 can be made of a material similar to that of soft part 44 of the first exemplary embodiment. The shape of soft part 44 is similar to that of soft part 44 of the first exemplary embodiment.

FIG. 16(A) to FIG. 16(C) are cross-sectional views schematically illustrating buffer member 40 changing its shape by receiving loads from power storage devices 10. In FIG. 16(A) to FIG. 16(C), illustration of electrode body 38 is omitted.

With respect to the dimension in first direction X, the dimension of protrusion 60 before deforming is larger than the dimension of soft part 44. Thus, as illustrated in FIG. 16(A), in a state before protrusion 60 deforms, top part 62 abuts on exterior can 14 of second power storage device 10b, and protrusion 60 receives a load from power storage device 10. That is, buffer member 40 is in the first state.

As illustrated in FIG. 16(B), when the load from power storage device 10 increases, base part 64 and side wall part 66 fall inward, and displacement of top part 62 starts in first direction X to approach first power storage device 10a. That is, buffer member 40 starts to change its state from the first state to the second state. Now, exterior can 14 of second power storage device 10b abuts also on soft part 44, and a load may be applied also to soft part 44. The load received by soft part 44 is smaller than the load received by hard part 42.

When protrusion 60 receives a load of a predetermined magnitude or more from power storage device 10, as illustrated in FIG. 16(C), top part 62 enters hollow part 68, resulting in the shape of the protrusion 60 partially inverting. As a result, protrusion 60 contracts in first direction X, and thereby the dimension of hard part 42 becomes smaller than the dimension of soft part 44. As a result, buffer member 40 is now in the second state in which soft part 44 receives the load from power storage device 10.

An effect similar to that of the first exemplary embodiment can be obtained also by buffer member 40 of the present exemplary embodiment. Note that, buffer member 40 of the present exemplary embodiment may also have a structure that contracts by two steps as in the first exemplary embodiment. An insulating sheet (not shown) may be provided between protrusion 60 and first power storage device 10a and between protrusion 60 and second power storage device 10b.

The exemplary embodiments of the present disclosure have been described in detail above. The above-described exemplary embodiments are merely specific examples for implementing the present disclosure. The contents of the exemplary embodiments do not limit the technical scope of the present disclosure, and many design changes such as modifications, additions, and deletions of configuration elements can be made without departing from the spirit of the invention defined in the claims. Any new exemplary embodiment to which design change has been made has an effect of the combined exemplary embodiments and of modified examples. In the above-described exemplary embodiments, with respect to the contents where such design changes can be made, the contents are emphasized with expressions such as "of the present exemplary embodiment" and "in the present exemplary embodiment". However, design changes are allowed even with respect to the contents without such expressions. Furthermore, any combination of configuration elements included in exemplary embodiments is also effective as an aspect of the present disclosure. Hatching in a cross section in the drawings does not limit the material of the object to which the hatching is applied.

Fifth Modified Example

Buffer member 40 may be provided to every combination of two adjacent power storage devices 10, or may be provided to some of the combinations. Buffer member 40 may be provided, in addition to that provided between two power storage devices 10, between power storage device 10 and end plate 4. Furthermore, buffer member 40 may be provided only between power storage device 10 and end plate 4.

Sixth Modified Example

Hard part 42 may be provided separately from separator 12. In an example of such a structure, hard part 42 is integrally molded with a support substrate (not shown). Then, the support substrate is joined to separator 12. Examples of a method of bonding the support substrate to separator 12 include a method of insert-molding the support substrate and separator 12, and a method of welding individually formed separator 12 to the support substrate using ultrasonic waves.

Other Modified Examples

The number of power storage devices 10 included in power storage module 1 is not particularly limited. Power storage module 1 needs to include at least one power storage device 10. The structure of each part of power storage module 1 including the structure of end plate 4 and that of binding member 6 is not limited.

REFERENCE MARKS IN THE DRAWINGS

1 power storage module
10 power storage device
10*a* first power storage device
10*b* second power storage device
12 separator
38 electrode body
40 buffer member
42 hard part
44 soft part
46 vulnerable part
48 first part
50 second part
52 third part
54 first vulnerable part
56 second vulnerable part
60 protrusion
62 top part
64 base part
68 hollow part

The invention claimed is:

1. A power storage module comprising:
at least one power storage device; and
a buffer member arranged with the at least one power storage device in a first direction, wherein
the buffer member includes a hard part including a predetermined hardness and a soft part softer than the hard part, the hard part and the soft part being configured to receive a load in the first direction from the at least one power storage device,
a shape of the hard part changes by the hard part receiving the load of a predetermined magnitude or more, and
a state of the buffer member changes, by the shape of the hard part changing, from a first state in which the load is received by the hard part to a second state in which the load is received by the soft part.

2. The power storage module according to claim 1, wherein regarding a dimension in a first direction of the hard part and a dimension in the first direction of the soft part, the hard part is larger than the soft part in the first state, and the soft part is larger than the hard part in the second state.

3. The power storage module according to claim 1, wherein
the hard part includes a vulnerable part that breaks or plastically deforms by receiving the load of a predetermined magnitude or more, and
entering of the second state occurs by the vulnerable part breaking or plastically deforming.

4. The power storage module according to claim 3, further comprising a first power storage device and a second power storage device that are adjacent to each other, wherein
the hard part before breaking or plastically deforming includes
a first part positioned closer to, among the first power storage device and the second power storage device, the first power storage device and separated from the second power storage device, and
a second part that is positioned closer to the second power storage device than the first part is and separated from the first power storage device,
the vulnerable part includes a first vulnerable part connecting the first part and the second part to each other and including a lower strength than the first part and the second part, and
the hard part contracts in the first direction by the first vulnerable part breaking or plastically deforming.

5. The power storage module according to claim 4, wherein
the hard part before breaking or plastically deforming includes a third part that is positioned closer to the second power storage device than the second part is and separated from the first power storage device,
the vulnerable part includes a second vulnerable part connecting the second part and the third part to each other and including a lower strength than the second part and the third part,
one of the first vulnerable part and the second vulnerable part includes a lower strength than another, and the hard part contracts by two steps by a vulnerable part having a low strength breaking or plastically deforming followed by a vulnerable part including a high strength breaking or plastically deforming.

6. The power storage module according to claim 1, wherein
the hard part includes a protrusion including a hollow part,
a top part and a base part of the protrusion are arranged in a first direction, and
when the hard part receives the load of a predetermined magnitude or more, the top part falls into the hollow part of the protrusion, resulting in a shape of the protrusion partially inverting.

7. The power storage module according to claim 1, wherein the hard part is provided on a separator having an insulating property to insulate a power storage device from an outside, and constitutes a part of the separator.

8. The power storage module according to claim 1, wherein the hard part overlaps with an electrode body included in the power storage device as viewed in the first direction.

9. The power storage module according to claim 1, wherein
the soft part is a sheet body and includes at least one through-hole penetrating the sheet body in the first direction, and
the hard part is inserted through through-hole and protrudes from the soft part in the first direction.

10. The power storage module according to claim 9, wherein the hard part is separated from at least a part of an inner peripheral surface of the at least one through-hole.

11. The power storage module according to claim 1, wherein the soft part is not disposed between the hard part and the power storage device in the first direction.

12. The power storage module according to claim 4, wherein a part of the hard part closer to the second power storage device includes a dimension smaller than a dimension of a part of the hard part closer to the first power storage device in a direction perpendicular to the first direction.

13. A buffer member arranged with at least one power storage device in a first direction, the buffer member comprising a hard part including a predetermined hardness and a soft part softer than the hard part, the hard part and the soft part being configured to receive a load in the first direction from the at least one power storage device, wherein
a shape of the hard part changes by the hard part receiving the load of a predetermined magnitude or more, and
a state of the buffer member changes, by the shape of the hard part changing, from a first state in which the load is received by the hard part to a second state in which the load is received by the soft part.

* * * * *